(12) United States Patent
Hamasaka et al.

(10) Patent No.: US 8,515,260 B2
(45) Date of Patent: Aug. 20, 2013

(54) INFORMATION RECORDING APPARATUS AND METHOD FOR THE SAME

(75) Inventors: Hiroshi Hamasaka, Hirakata (JP);
Hiroshi Yahata, Moriguchi (JP);
Tomotaka Yagi, Nishinomiya (JP);
Nobuo Nakanishi, Kadoma (JP)

(73) Assignee: Panasonic Corporation, Osaka (JP)

( * ) Notice: Subject to any disclaimer, the term of this patent is extended or adjusted under 35 U.S.C. 154(b) by 835 days.

(21) Appl. No.: 11/902,174

(22) Filed: Sep. 19, 2007

(65) Prior Publication Data

US 2008/0019675 A1 Jan. 24, 2008

Related U.S. Application Data

(62) Division of application No. 10/046,512, filed on Jan. 16, 2002, now Pat. No. 7,356,247.

(30) Foreign Application Priority Data

Jan. 16, 2001 (JP) ................................ 2001-007900
Apr. 27, 2001 (JP) ................................ 2001-131407

(51) Int. Cl.
*H04N 5/92* (2006.01)

(52) U.S. Cl.
USPC ........................................................ 386/326

(58) Field of Classification Search
None
See application file for complete search history.

(56) References Cited

U.S. PATENT DOCUMENTS

| | | | |
|---|---|---|---|
| 5,691,972 A | 11/1997 | Tsuga et al. | |
| 6,181,870 B1 | 1/2001 | Okada et al. | |
| 6,266,483 B1 | 7/2001 | Okada et al. | |
| 6,360,057 B1 * | 3/2002 | Tsumagari et al. | ........... 386/241 |
| 6,480,669 B1 | 11/2002 | Tsumagari et al. | |
| 6,580,869 B1 * | 6/2003 | Ando et al. | ................... 386/217 |
| 2002/0150385 A1 | 10/2002 | Yoo et al. | |

FOREIGN PATENT DOCUMENTS

| | | |
|---|---|---|
| EP | 0 903 738 | 3/1999 |
| JP | 9-312827 | 12/1997 |
| JP | 2000-152183 | 5/2000 |
| JP | 2000-217066 | 8/2000 |

(Continued)

OTHER PUBLICATIONS

U.S. Appl. No. 10/046,580, filed Jan. 16, 2002, entitled "*Information Recording Medium, Apparatus and Method for Recording/Reproducing Information To/From the Medium*", by Kojiro Kawasaki, et al.

(Continued)

*Primary Examiner* — William C Vaughn, Jr.
*Assistant Examiner* — Daniel Tekle
(74) *Attorney, Agent, or Firm* — Wenderoth, Lind & Ponack, L.L.P.

(57) ABSTRACT

Entry points are managed so they are easy for users to understand. The data recording apparatus has a receiver unit that receives a stream of encoded digital data; an analyzer that detects change in an attribute of the received stream and that outputs the detection information; a controller that generates management information containing the detection information output by the analyzer and time information indicating detection time of the change as a first entry point; a drive that records the management information and the received stream to a data storage medium; and an input unit that defines a second entry point. This second entry point is set relative to the playback path of the stream and is used to access and read from a particular point in the stream. The controller further generates the management information containing the first entry point and the second entry point separately identified.

5 Claims, 33 Drawing Sheets

(56) References Cited

FOREIGN PATENT DOCUMENTS

| | | |
|---|---|---|
| JP | 2000-261741 | 9/2000 |
| JP | 2000-322875 | 11/2000 |
| JP | 2000-324444 | 11/2000 |
| KR | 2000-0028530 | 5/2000 |

OTHER PUBLICATIONS

U.S. Appl. No. 09/522,007, filed Mar. 9, 2002, entitled "*Optical Disc, Optical Disc Recording and Reproducing Apparatus, and Optical Disc Recording and Reproducing Method*", by Noriko Sugimoto et al.

U.S. Appl. No. 09/893,618, filed Jun. 29, 2001, entitled "*Optical Disc, Optical Disc Recording and Reproducing Apparatus, and Optical Disc Recording and Reproducing Method*", by Noriko Sugimoto et al.

International Search Report for International Application No. PCT/JP02/00219 mailed Apr. 16, 2002.

Novelty Search Report for Hungarian application No. P0303862 dated Aug. 9, 2005.

Supplementary European Search Report for European application No. EP 02715743 dated May 16, 2007.

\* cited by examiner

*Fig.5*

| PROGRAM | RECORDING DATE AND TIME |
|---|---|
| 1) MOVIE | 99.9.20 pm9 : 00- |
| 2) MORNING SERIAL DRAMA | 99.9.22 am8 : 30- |
| 3) WORLD CUP CHAMPIONSHIP | 99.6.10 am2 : 00- |
| 4) BEETHOVEN | 96.4.1 |

Fig.13

EIT/componet_group_descriptor componet_group_type='000'

(1) componet_group_id="0x0" (MAIN)

| CA_unit_id="0x0" (NO CHARGE) | : componet_tag=V0 |
| --- | --- |
| | : componet_tag=A0 | text = "NORMAL BROADCAST"

(2) componet_group_id="0x1" (SUB 1)

| CA_unit_id="0x0" (NO CHARGE) | : componet_tag=V1 |
| --- | --- |
| | : componet_tag=A0 |
| | : componet_tag=A3 | text = "LAST HOLE"

(3) componet_group_id="0x2" (SUB 2)

| CA_unit_id="0x0" (NO CHARGE) | : componet_tag=V2 |
| --- | --- |
| | : componet_tag=A0 | text = "TOP GOLFERS"

USER PRESENTATION UNIT

| | GOLF BROADCAST (NORMAL BROADCAST) | |
| --- | --- | --- |
| MAIN | Video_PID="0x01" | : componet_tag=V0 |
| | Audio_PID="0x02" | : componet_tag=A0 |
| | GOLF BROADCAST (LAST HOLE) | |
| SUB 1 | Video_PID="0x03" | : componet_tag=V1 |
| | Audio_PID="0x02" | : componet_tag=A0 |
| | Audio_PID="0x07" | : componet_tag=A3 |
| | GOLF BROADCAST (TOP GOLFERS) | |
| SUB 2 | Video_PID="0x05" | : componet_tag=V2 |
| | Audio_PID="0x02" | : componet_tag=A0 |

Fig. 14

ENTRY POINT TABLE

| EP NUMBER | EP_TY1 | User_EP | PG_Change | PSI_SI | SQH_Change | Data_Top | Data_Change | PMT_Change | DE_Change | Module_Change | Aud_Change | Multi_View | PARENTAL CONTROL | LINKS | EP_PTM (TIME) |
|---|---|---|---|---|---|---|---|---|---|---|---|---|---|---|---|
| ENTRY 1 | | | | | | | | | | | | | | | |
| ENTRY 2 | | | | | | | | | | | | | | | |

ENTRY POINT TABLES

Fig. 16

ENTRY POINT TABLES

ENTRY POINT TABLE FOR VIEW #1

| EP NUMBER | EP_TY1 | EP_PTM (TIME) |
|---|---|---|
| ENTRY 1 | Multi-View | |
| ENTRY 2 | | |

ENTRY POINT TABLE FOR VIEW #2

| EP NUMBER | EP_TY1 | EP_PTM (TIME) |
|---|---|---|
| ENTRY 1 | User_EP | |
| ENTRY 2 | | |

ENTRY POINT TABLE FOR VIEW #3

| EP NUMBER | EP_TY1 | EP_PTM (TIME) |
|---|---|---|
| ENTRY 1 | User_EP | |
| ENTRY 2 | | |

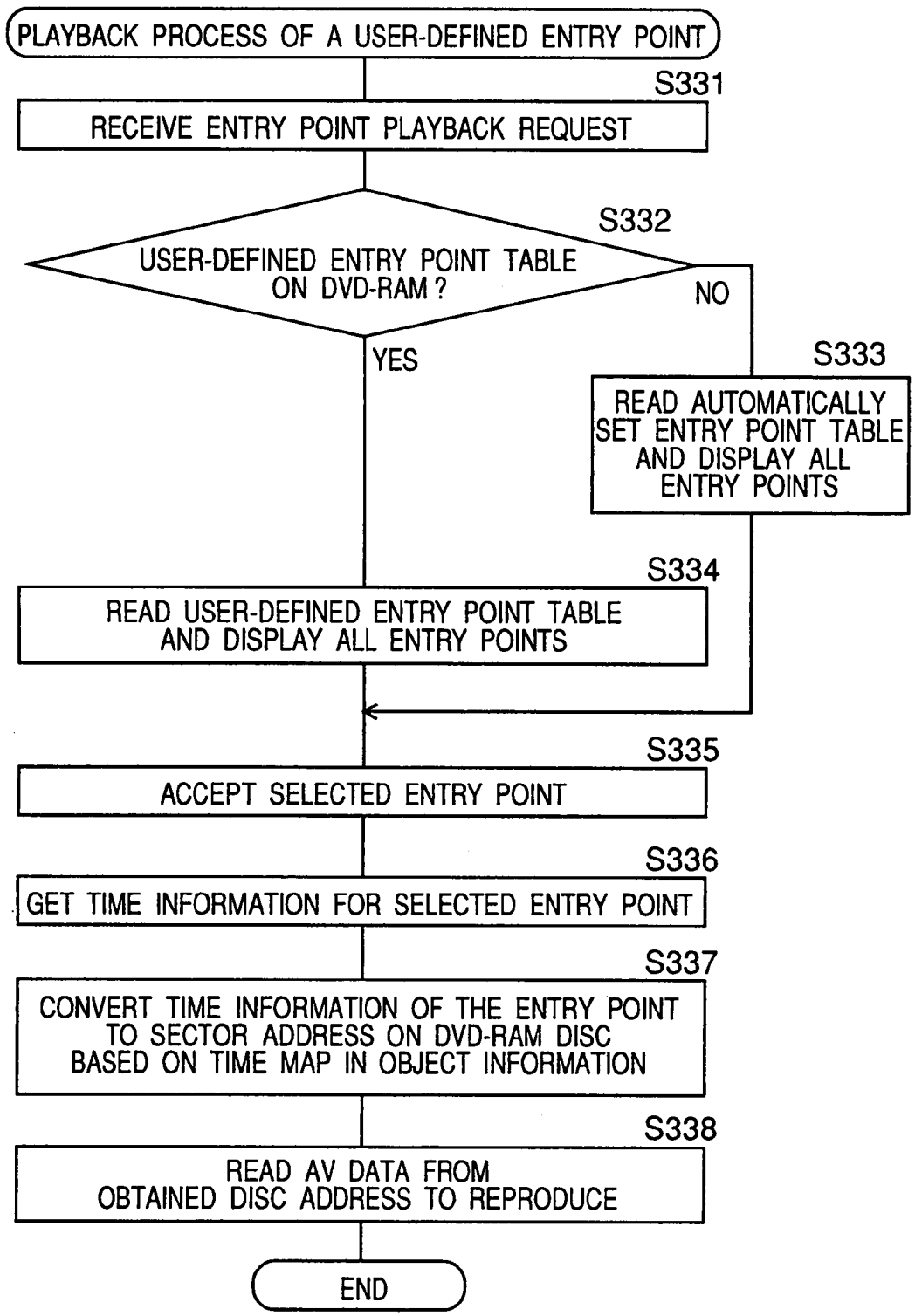

INFORMATION RECORDING APPARATUS AND METHOD FOR THE SAME

This application is a divisional of U.S. application Ser. No. 10/046,512, filed Jan. 16, 2002, which is now U.S. Pat. No. 7,356,247.

BACKGROUND OF THE INVENTION

1. Field of the Invention

The present invention relates generally to a readable/recordable data storage medium, and relates, more specifically, to a data storage medium on which various types of multimedia data, including video data, still picture data, and audio data are recorded. The invention also relates to an apparatus and a method that records information on or reproducing recorded information from such a data storage medium.

2. Description of Related Art

In addition to being used to store computer data, read-only disc media such as DVD (Digital Versatile Disc)-ROM discs (hereinafter referred to as "DVD-ROM" discs) is exploited for recording movies and other video images, photographs and other still images, and audio data (collectively referred to below as "AV data"). Phase change type rewritable media such as DVD-RAM discs with a storage capacity of several gigabytes have also recently become practical and widely available.

With practical development of MPEG (Moving Picture Experts Group) and MPEG-2 as international coding standards for digital AV content, decoders and encoders, DVD-RAM applications are expected to quickly grow from a storage medium for computer data to a recording and playback medium for audio and video (AV) data. More specifically, DVD-RAM media is expected to replace a magnetic tape as the preferred medium for recording and playing AV data.

A problem is how to use such high capacity optical disc to record AV data so as to achieve new functionality and performance greatly surpassing that offered by conventional AV equipment.

One of the greatest benefits of the disc format is a significant improvement in random accessibility. While tape media can be randomly accessed, several minutes are typically required to rewind a video tape. This is many times slower than the comparable seek time (approximately several 10 ms) of optical disc media. For practical purposes, tape is therefore not considered a random access medium.

Random accessibility also enables distributed recording of AV data to an optical disc, something that is not possible with conventional magnetic tape media. FIG. 1 is a block diagram of DVD recording device (below referred to as a DVD recorder or drive). The drive has optical pickup 11 that reads data from DVD-RAM disc 10, error correcting code (ECC) processor 12, one track buffer 13, switch 14 that switches input/output to track buffer 13, encoder 15 and decoder 16.

As shown in FIG. 1, data is recorded on DVD-RAM disc 10 in each sector as the smallest recording unit. Each sector holds 2 KB. Groups of 16 sectors form one ECC block, the data unit to which ECC processor 12 applies error correction processing.

Track buffer 13 is used to record AV data at a variable bit rate in order to record AV data more efficiently to DVD-RAM disc 10. More specifically, while DVD-RAM disc 10 read/write rate Va is a fixed rate, the bit rate Vb of the AV data varies according to the complexity of the content (e.g., images if the content is video). Track buffer 13 is used to absorb such difference of bit rate. Track buffer 13 can also be effectively used to supply AV data continuously to decoder 16 when the AV data is recorded in dispersed locations on DVD-RAM disc 10. Track buffer 13 also enables the AV data sent to encoder 15 to be recorded on the DVD-RAM disc.

The Universal Disc Format (UDF) file system is used on DVD-RAM discs in order to use high capacity DVD-RAM discs more effectively and enable access by personal computers (PCs). The UDF file system is described in detail in the Universal Disc Format Standard.

A typical setup of conventional AV equipment is described next. FIG. 2 shows a relationship between conventional AV equipment, media, and formats. If the user wishes to view a video tape, for example, the user normally inserts a video tape to a VCR and watches it on a television. To listen to music, the user inserts a CD into a CD player or compact stereo system with a built-in CD player, and listens to the music through speakers or headphones. With conventional AV equipment there has thus been a one-to-one relationship between a particular format (video or audio) and the media used for that format. This means that the user must change the media and AV equipment according to the content to be seen or heard, and is somewhat inconvenient.

With recent advances in digital technologies DVD video discs are increasingly used to deliver prepackaged software and digital satellite broadcasting services. These developments have been made possible by the digital technology revolution and particularly by the widespread adoption of MPEG standards.

FIG. 3 shows the MPEG stream used for DVD video discs and digital broadcasting. The MPEG standard has a hierarchical structure as indicated in FIG. 3. What is important to note here is that the MPEG system layer stream used by the final application is different in packaged media such as DVD video disc and communications media such as digital satellite broadcasting. The MPEG system layer stream for packaged media is called the "MPEG program stream" and transmits data in units referred to as "packs." Each pack corresponds to one sector, the recording unit of DVD video discs, for example. As noted above, each sector holds 2048 bytes. The MPEG system layer stream for broadcast media is called the "MPEG transport stream" and transmits data in TS packet units of 188 bytes each due to ATM considerations.

It has been widely expected that MPEG, a digital coding technology for audio-video data, would make it possible to freely handle AV data independently of the media, but small differences such as those noted above have meant that AV equipment and media compatible with both packaged media and communications media do not exist at present. DVD-RAM and other types of high capacity optical discs are expected to eliminate the inconveniences of conventional AV equipment.

The introduction of an optical disc medium, on which both the MPEG transport stream and MPEG program stream can be recorded, has been desired since the introduction of digital satellite broadcasting.

A DVD recorder enabling the user to freely display and present various formats and content types using a single AV device as shown in FIG. 4 without being concerned with the specific format is desired. This is described more specifically below with reference to FIG. 5 which shows an exemplary menu screen presented by a DVD recorder. This menu enables the user to seamlessly select a (1) movie delivered via digital satellite broadcast, or a (2) morning serial drama or (3) World Cup final delivered via conventional television antenna, or a (4) Beethoven piece dubbed from a CD without the user being aware of the recording media or format.

The biggest obstacle to achieving this type of DVD recorder, using optical disc media widely considered to be the next-generation AV recording medium is, how to uniformly manage AV data and AV streams of different formats. Special management techniques are not needed to only manage already existing formats. However, using a management technique that is compatible not only with the many formats already in use but can also handle new formats likely to be introduced in the future is essential to achieving the type of DVD recorder described above.

Differences in the user interface resulting from whether different AV streams can be uniformly handled or not could lead to inconveniences similar to those presented by the related art, that is, requiring the user to operate the equipment with an awareness of the specific content or format. A major problem, therefore, is how the receiver handles AV stream data digitized by the sender, such as in digital broadcasting. More particularly, in order for the various functions provided by new digital satellite broadcasting services to be usable after broadcast content is recorded, that is, in order to enable time shift recording, it is essential to record the broadcast stream as it was broadcast. The MPEG transport stream enables multiple video streams to be multiplexed to enable multiple views.

It is also desirable to be able to time-shift record new digital broadcasts anticipated in the future even if certain aspects of the service content are as yet undefined.

The "entry point" is one example of a feature enabling digitally recorded AV data to be accessed at random, the greatest feature of a disc medium. There is also a growing need for the user to be able to set entry points at desirable points in the content so that these entry points can be directly accessed to start playback therefrom. However, there are also entry points that are automatically recorded by the disc recorder. Confusion arises when the user-defined entry points and automatically recorded entry points are mixed, and there is therefore a need for a data structure enabling these different entry points to be separately identified.

SUMMARY OF THE INVENTION

An object of the present invention is therefore to manage entry points in a manner that is easy for the user to understand.

A further object of the invention is to enable recording a stream used in digital broadcasting (e.g., the MPEG transport stream) together with other AV streams, and to enable reproduction of the recorded data.

To achieve these objects a data recording apparatus according to the present invention has a receiver unit, a controller, a drive, and an input unit. The receiver unit receives a stream of encoded digital data. The analyzer detects change in an attribute of the stream received by the receiver unit and outputs detection information. The controller generates management information containing the detection information output by the analyzer and time information indicating detection time of the change occurred as a first entry point. The drive records the management information generated by the controller and the stream received by the receiving unit to a data storage medium. The input unit defines a second entry point. This second entry point is set relative to the playback path of the stream and is used to enable accessing a particular point in the stream so that reproduction can start from that point. The controller generates management information contains the first entry point and the second entry point, which can be separately identified.

A data recording method according to the present invention has a sequence of steps accomplishing the above described process. The present invention can also be expressed as a data recording program executed by a computer to perform the above process, thereby achieving the above objects. This data recording program can be recorded on a storage medium.

The controller preferably generates management information including a first table containing the first entry points and a second table recording the second entry points.

Alternatively, the controller generates management information including separate identification flags assigned to the first entry points and second entry points.

The present invention provides management information enabling entry points set based on stream attributes and entry points set by a user to be identified. By selectively displaying the entry points based on this management information, the user can easily find a desired scene from the displayed information.

More specifically, the transport stream transmitted as part of a digital broadcast can be recorded together with other AV streams. Further, one or more user-defined entry points may be distinguished from original entry points set relative to the recorded digital broadcast object. In addition, one or more flags may be provided in the entry point data of the entry point table, which indicates a program change, a flag indicating a change in PSI/SI information, a flag indicating a change in a MPEG stream attribute, a flag indicating the starting point of a data carousel, a flag indicating the location of a change in data carousel content, a flag indicating the location of a change in PMT content, a flag indicating the location of a module change, a flag indicating the location of a data event change, a flag indicating an audio attribute change, a field indicating the number of views in a program, and a parental control field. By displaying this information, the user can easily locate a desired scene from the displayed information. The user can also be informed of cells containing multiple views.

Other objects and attainments together with a fuller understanding of the invention will become apparent and appreciated by referring to the following description and claims taken in conjunction with the accompanying drawings.

BRIEF DESCRIPTION OF THE DRAWINGS

This and other objects and features of the present invention will become clear from the subsequent description of a preferred embodiment thereof made with reference to the accompanying drawings, in which like parts are designated by like reference numerals and in which:

FIG. 5 is a menu presented by a DVD recorder;

FIG. 13 is a structure used to describe multiple views;

FIG. 14 is a structure of an entry point according to the present invention;

FIG. 16 is a structure of an entry point table provided for each view;

FIG. 33 is a flow chart shown an entry point reproduction process.

DETAILED DESCRIPTION OF THE PREFERRED EMBODIMENTS

A data storage medium, recording apparatus, and playback apparatus according to the present invention are described below with reference to the accompanying figures using by way of example a DVD-RAM disc, DVD recorder, and DVD player.

A DVD-RAM disc according to the present invention enables recording AV data in different formats to a single disc and uniformly managing the recorded data. This enables video data recorded by encoding an analog broadcast signal to an MPEG transport stream, and an MPEG transport stream received from a digital broadcast, to the same disc. This data recorded on a DVD-RAM disc can also be reproduced in a specified sequence. To achieve this a DVD-RAM disc according to the present invention contains management information for managing AV streams independently of the AV data format.

Figure 1:
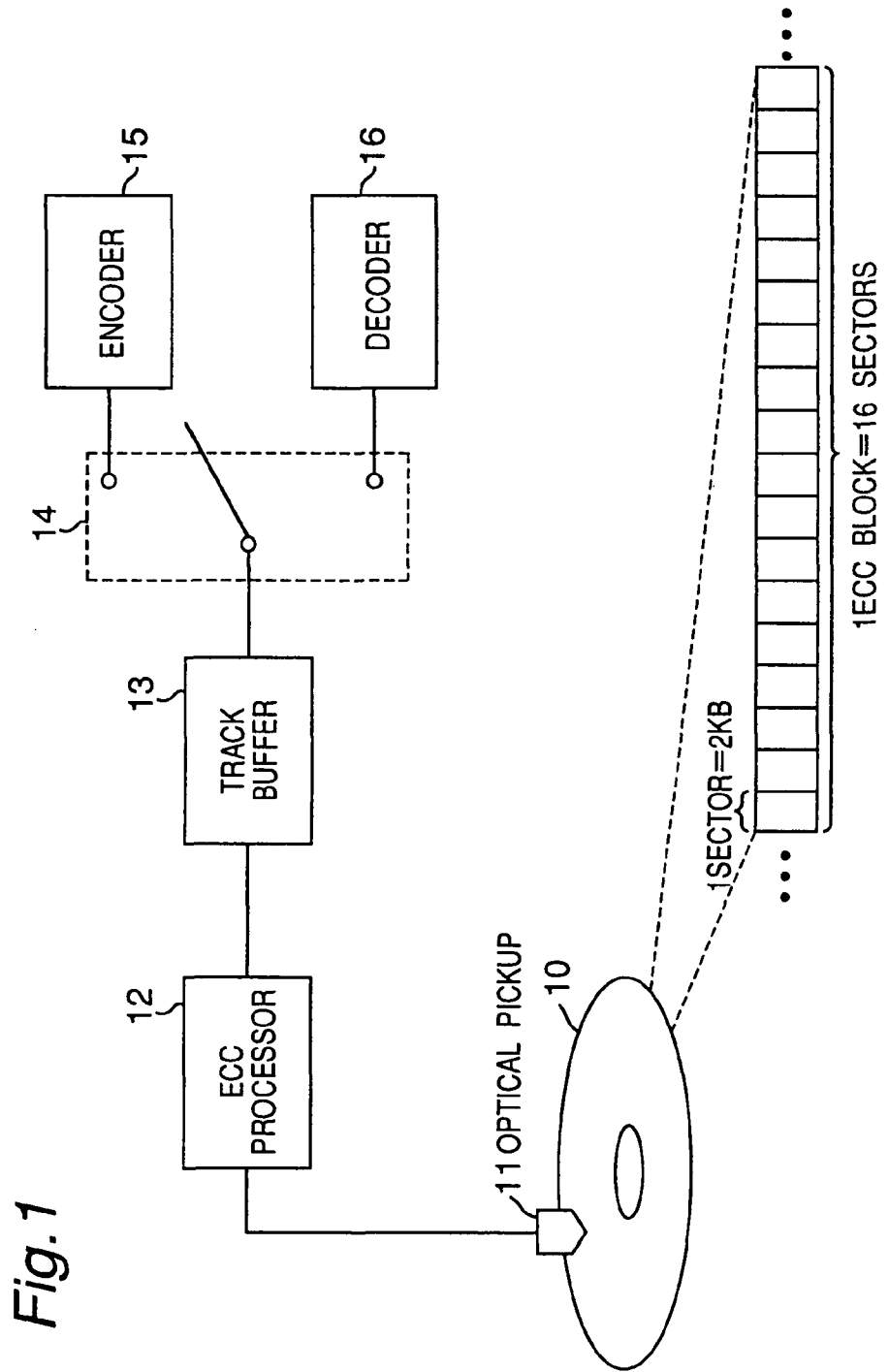
FIG. 1 is a block diagram of a DVD recorder drive.
Figure 2:
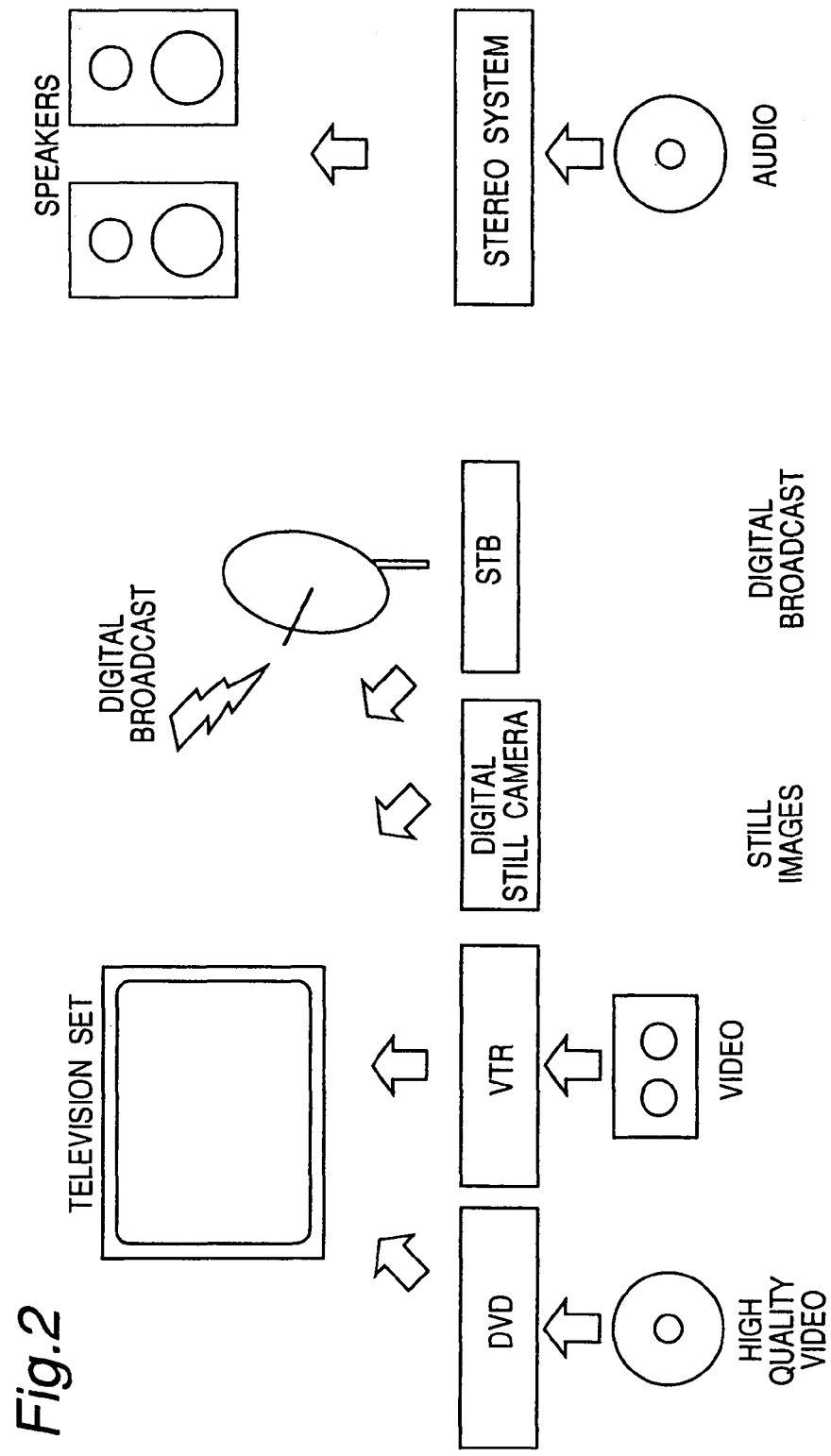
FIG. 2 is a relationship between conventional AV equipment and media.
Figure 3:
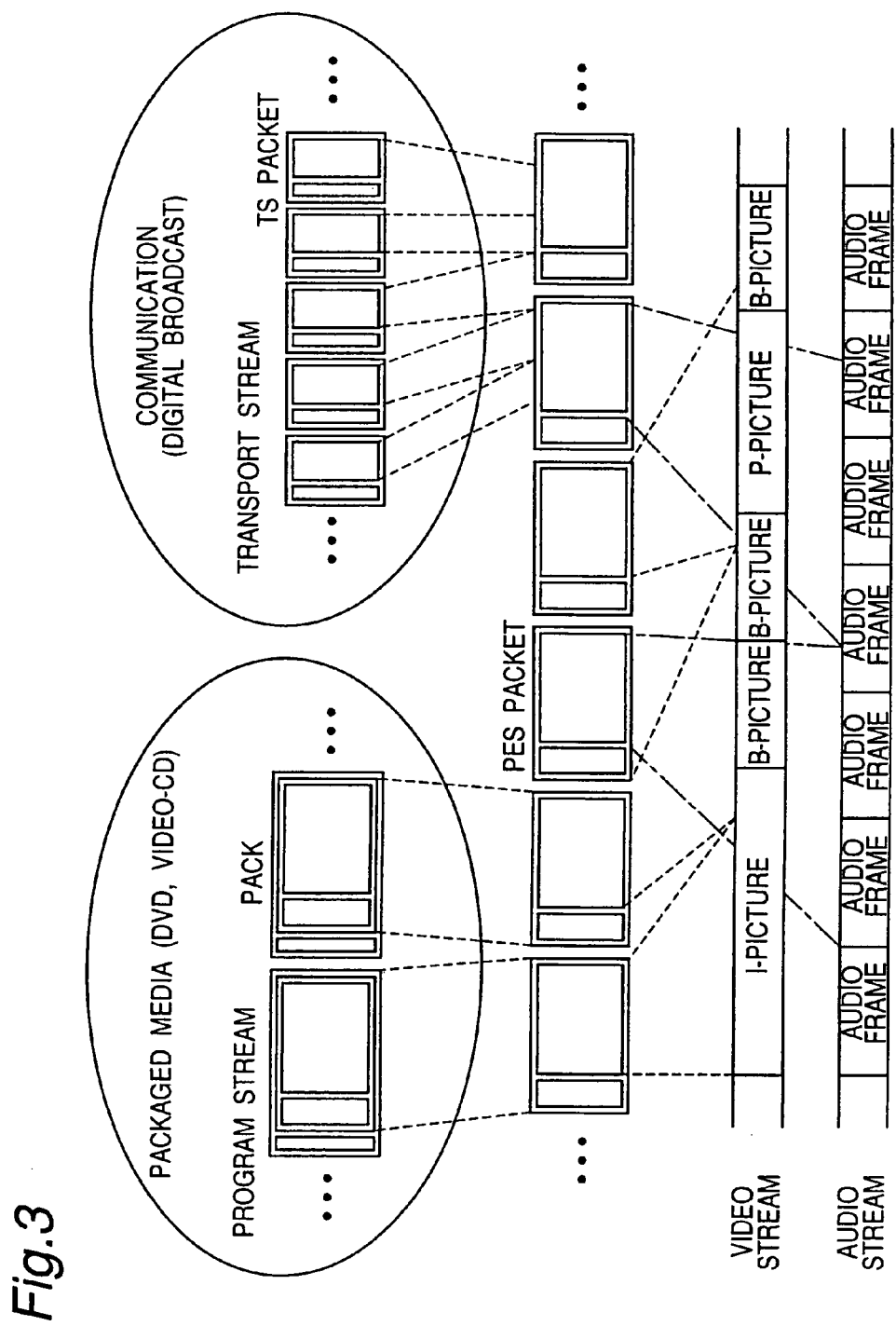
FIG. 3 is a structure of the MPEG program stream and transport stream.
Figure 4:
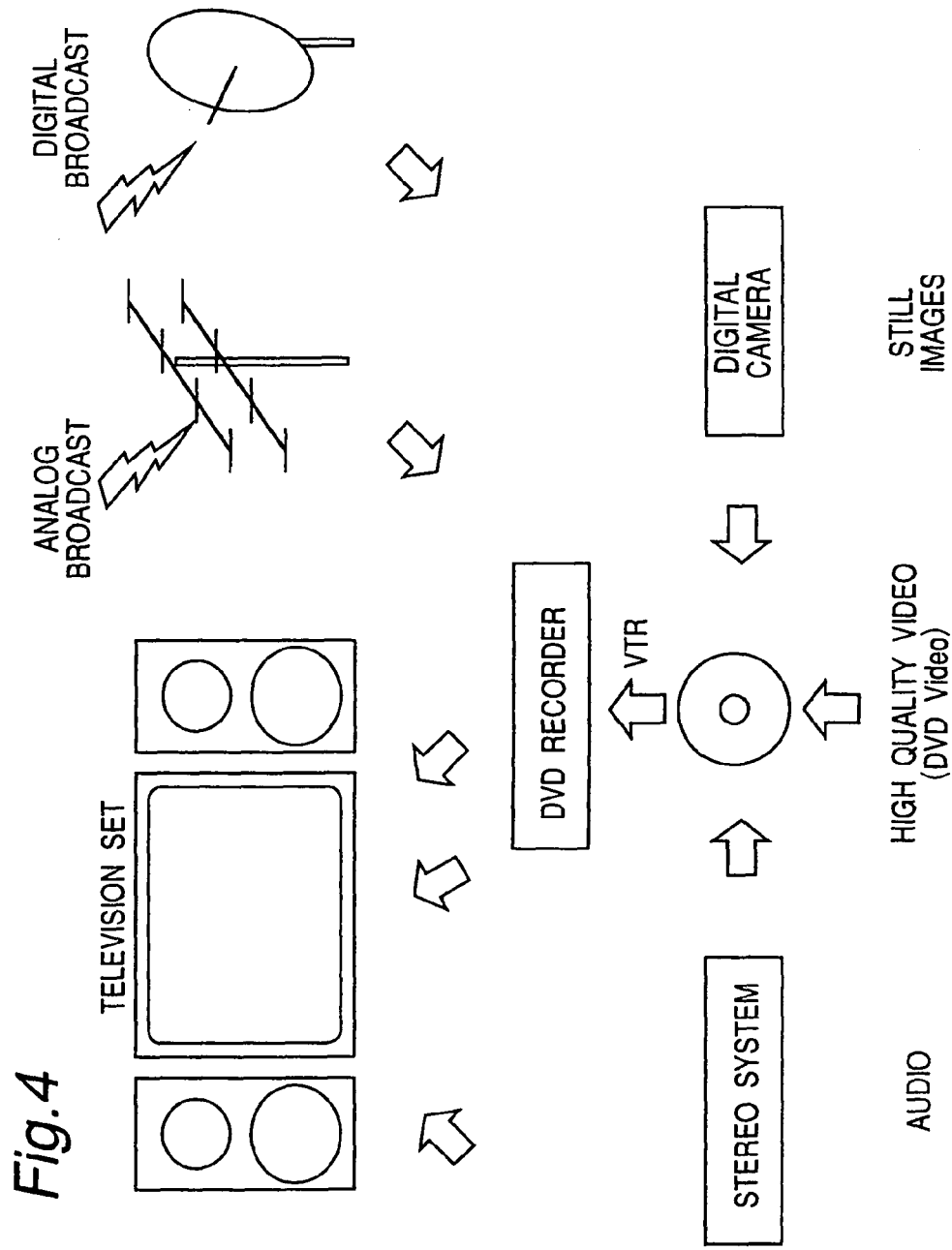
FIG. 4 is a relationship between media and AV equipment sought by a DVD recorder.
Figure 6:
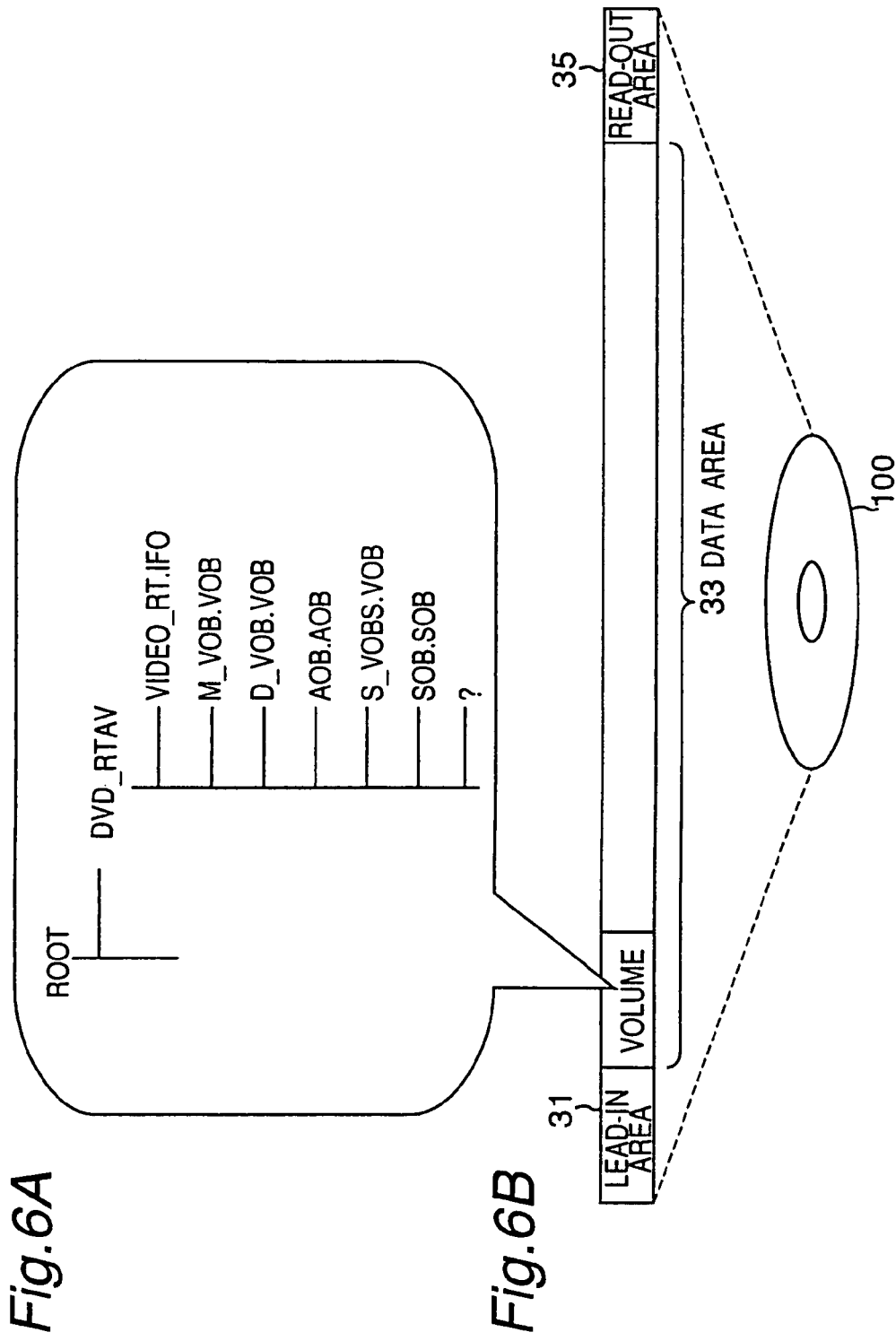
FIG. 6A is a relationship between an AV file and directory.
FIG. 6B is a concept of address space on a disc.

The structure of data recorded on a DVD-RAM disc according to the present invention is described first with reference to FIGS. 6A and 6B. FIG. 6A shows the data structure written to a DVD-RAM disc 100. This data structure is recognizable through the file system of disc 100. FIG. 6B shows the structure of the physical sectors of disc 100.

As shown in the figure a physical sector starts with a lead-in area 31. This lead-in area 31 includes a reference signal needed to stabilize the servo and an identification signal for identifying the type of media. A data area 33 follows lead-in area 31. Logically valid data is recorded to data area 33. Management information for the file system, called volume information, is recorded to the beginning of each data area 33. The file system preferably uses the UDF format described above and known from the literature, and further description thereof is thus omitted. Data area 33 is followed by a lead-out area 35. As in lead-in area 31, a reference signal is also recorded to lead-out area 35.

Data written to disc 100 can be handled through the file system as directories and files as shown in FIG. 6A. As shown in FIG. 6A all data handled by the DVD recorder is managed under the DVD_RTAV directory directly below the ROOT directory.

A DVD recorder according to this embodiment of the invention handles two file types: AV files containing audio/video data (AV data) and management information files containing information for managing the AV files. In the example shown in FIG. 6A VIDEO_RT.IFO is the management information file and M_VOB.VOB is an AV file containing video data. D_VOB.VOB is a file containing digital broadcast video data.

Each of these files is described in detail below. It will be noted that each AV stream is defined as an "object" in this embodiment. An object can contain various types of AV streams, including MPEG program streams. By treating AV streams as abstract objects, AV stream management information can be uniformly defined as object information (ObjectI).

Figure 7:
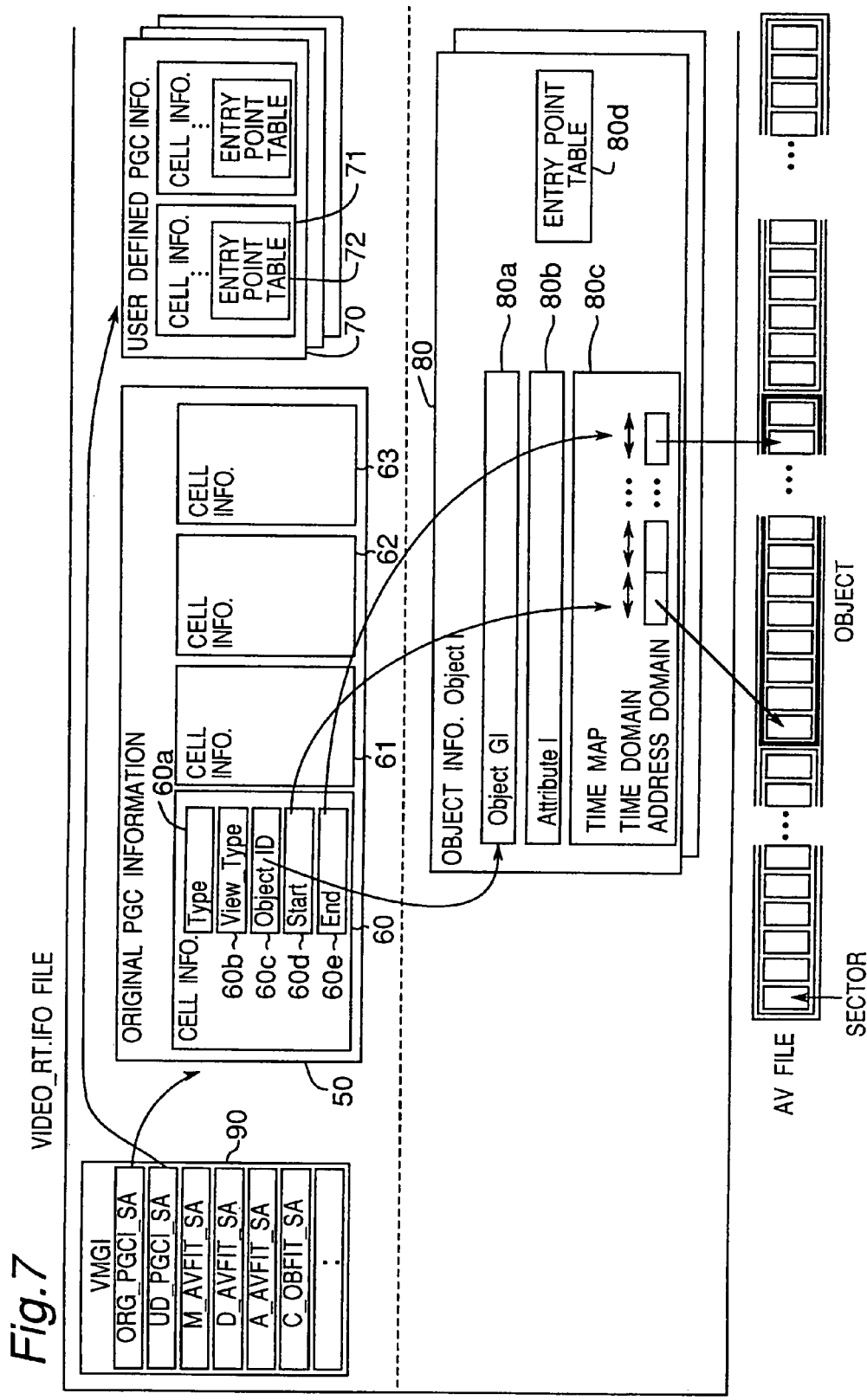
FIG. 7 is a relationship between an object, object information, and PGC information.

Management information is described first with reference to FIG. 7. AV file management information VIDEO_RT.IFO is used as an example of management information. FIG. 7 shows a relationship between an AV file object, object information, and program chain (PGC) information (PGC information).

Management information VIDEO_RT.IFO contains object information 80 that manages addresses (recording positions) of objects, PGC information 50 and 70 that defines playback order and playback time of the data to be reproduced from the data recorded on the DVD-RAM disc, and video manager general information (VMGI) 90. Each AV stream contains differences unique to the particular format as well as common sharable attributes (such as time attributes), thus making abstraction possible as noted above. AV streams of the same format are also stored in the sequence recorded to a single AV file.

Object information (ObjectI) 80 contains general information (Object GI) 80a about the object, object attribute information (AttributeI) 80b, access map 80c to be used to convert the object playback time to a disc address, and entry point table 80d for PGC information 50 and indicating access points (each point referred to below as an entry point) to a particular location in the object.

Access map 80c is used for conversions between the time base and data amount of bit stream. Access map 80c contains data correlating time space to address space for each object unit. This is because one object contains plural object units (VOBU) as further described below. Access map 80c is needed because an AV stream generally has two references, a time base and data amount of bit stream, and the correlation between these is not perfect. For example, using a variable bit rate, that is, changing the bit rate according to the complexity of the images, is increasingly the preferred encoding method with MPEG-2 video, an international standard for video stream encoding. Using a variable bit rate means there is no direct correlation between the playback time and the amount of data from the beginning of the stream, and random access referenced to the time base is therefore not possible. Access map 80c is thus needed to define the correlation between time and data.

PGC information 50, 70 are used to control reproducing the video data and audio data, that is, the objects, recorded on disc 100 such as DVD-RAM. Each of PGC information 50, 70 indicates one unit for continuous reproduction by the DVD player. More specifically, PGC information 50, 70 indicate playback sequence of cell information 60, 61, 62, 63 indicating the object to play back and a particular playback interval in the object. The cell information 60 is further described below. There are two types of PGC information: original PGC information 50 generated automatically by the DVD recorder during object recording so as to include all recorded objects, and user-defined PGC information 70 enabling the user to freely define a playback sequence.

It should be noted that the entry point table 80*d* of object information (ObjectI) 80 described above defines entry points relating only to original PGC information 50 which are also referred to below as original entry points. Entry points relating to user-defined PGC information 70, which are also referred to below as user entry points, are defined in respective cell information in user-defined PGC information 70, for example, in an entry point table 72 contained in cell information 71. Original entry points are set automatically by the DVD recorder in the actual object defined in object information (ObjectI) 80. User-defined entry points are set as desired by the user in the object playback path.

Note, further, that entry point table 80*d* can be provided in original PGC information 50. If contained in original PGC information 50, entry point table 80*d* can be provided to each cell information block or provided as an element of original PGC information 50 not contained in the cell information. The entry point table contained in user-defined PGC information 70 need not be provided in the cell information, and can be recorded as an element of user-defined PGC information 70 not contained in the cell information.

The structure and function of PGC information 50 and 70 are identical except that user-defined PGC information 70 is defined by the user and contains entry point table 72. Original PGC information 50 is therefore primarily described in detail below. Entry point tables 72 and 80*d* are described further below.

As shown in FIG. 7 original PGC information 50 contains at least one block of cell information 60, 61, 62, 63. Cell information 60 specifies the object to reproduce and the playback time of that object. Original PGC information 50 generally records multiple cells in sequence. The recording sequence of the cell information in original PGC information 50 indicates the playback sequence when the cells identified by each cell are reproduced.

Each cell information block, such as cell information 60, contains object type (Type) 60*a* indicating the type of object specified, object's multi-view information (View_Type) 60*b*, Object ID 60*c* identifying the object, starting position information (Start) 60*d* in the object on the time base, and end position information (End) 60*e* on the time base. During data reproduction cell information 60 in original PGC information 50 is read in sequence and the object specified by each cell is reproduced for the playback time declared by the cell.

Figure 8:
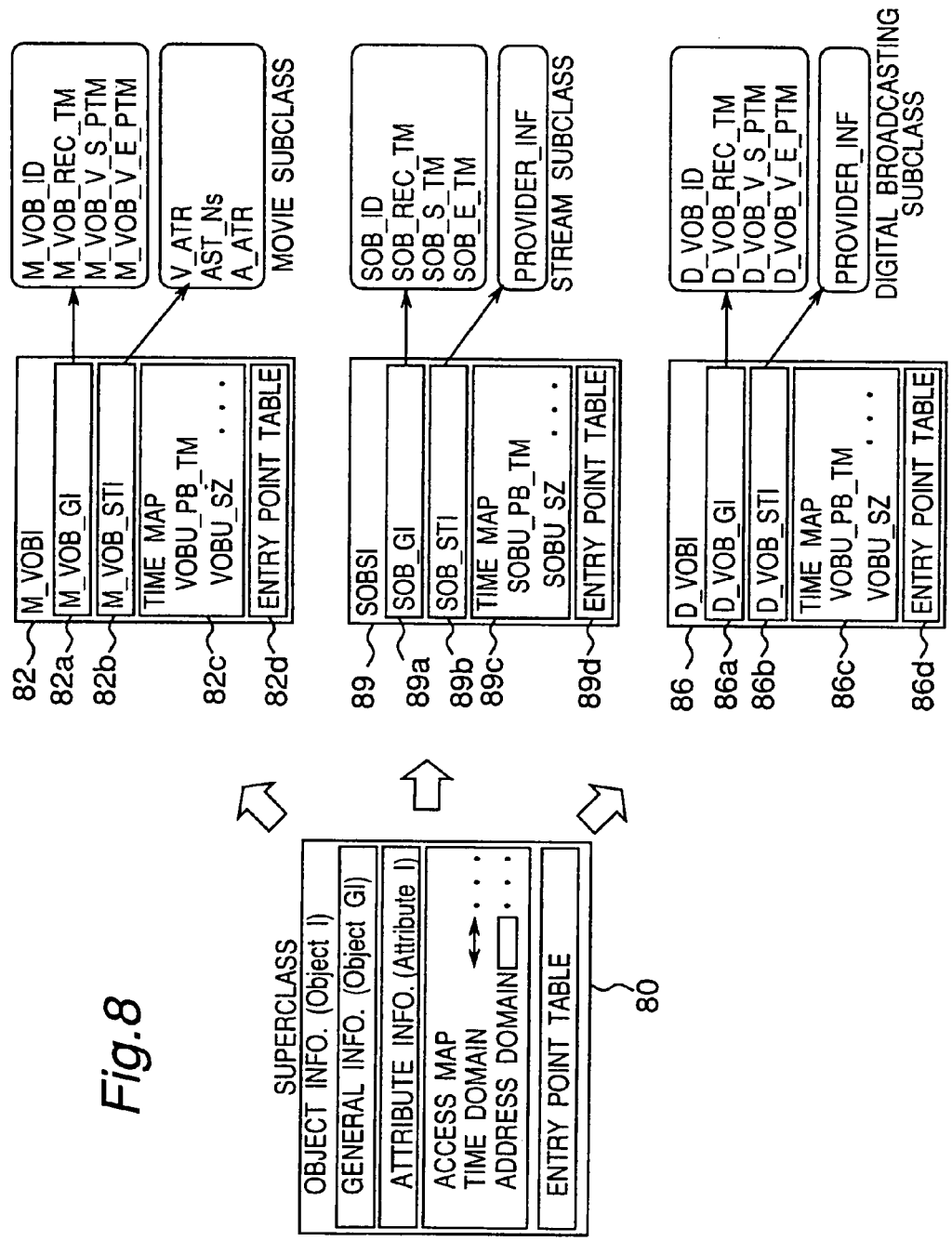
FIG. 8 is a structure of stream management information derived from object information.

For the abstracted object information to be applied to an actual AV stream it must be more specifically defined. This is more easily understood with reference to the class inheritance of the object oriented model where object information is a superclass and constructions specific to each AV stream are subclasses. FIG. 8 shows management information for each stream derived from the object information. As will be known from this figure subclasses of the object information in this embodiment of the invention include a video subclass, digital video broadcasting subclass, and stream subclass.

The video subclass is movie video object information M_VOBI 82 presents video object information (that is, the MPEG transport stream). The digital video broadcast subclass is digital video broadcast object information D_VOBI (digital video object information) 86 presenting object information for digital broadcast data (the MPEG transport stream). The stream subclass is stream object information (SOBI) 89 presenting object information for streams of undefined application. These object information subclasses are described below.

Movie video object information M_VOBI 82 includes general MPEG transport stream information (M_VOB_GI) 82*a*, video object stream information (M_VOB_STI) 82*b*, time map 82*c*, and entry point table 82*d*.

General information (M_VOB_GI) 82*a* in movie video object information M_VOBI 82 includes video object identification information M_VOB_ID, video object recording time M_VOB_REC_TM, video object starting time information M_VOB_V_S_PTM, and video object end time information M_VOB_V_E_PTM.

Video object stream information (M_VOB_STI) 82*b* includes the video stream coding mode and other video stream information V_ATR, number of audio streams AST_Ns, and the audio stream coding mode and other audio stream information A_ATR.

Time map 82*c* includes the starting address of video objects in the AV file, playback time VOBU_PB_TM of each video object unit (VOBU), and data size VOBU_SZ. A video object unit (VOBU) is the smallest access unit in a movie video object M_VOB, and is described below in detail.

Digital video broadcast object information (D_VOBI) 86 includes general information about MPEG transport stream D_VOB_GI 86*a*, stream information D_VOB_STI 86*b*, time map 86*c*, and entry point table 86*d*.

General information D_VOB_GI 86*a* includes digital broadcast object identification information D_VOB_ID, digital broadcast object recording time D_VOB_REC_TM, digital broadcast object starting time information D_VOB_V_S_PTM, and digital broadcast object end time information D_VOB_V_E_PTM.

Stream information D_VOB_STI 86*b* includes PROVIDER_INF storing additional information distributed with the digital broadcast.

Time map 86*c* includes the starting address of the digital broadcast object (D_VOB) in the AV file, playback time VOBU_PB_TM of each object unit (VOBU), and data size VOBU_SZ.

Stream object information (SOBI) 89 contains general information SOB_GI 89*a* about the digital stream, digital stream information SOB_STI 89*b*, time map 89*c*, and entry point table 89*d*.

General information SOB_GI 89*a* about the digital stream includes stream object identification information SOB_ID, stream object recording time SOB_REC_TM, stream object starting time information SOB_S_PTM, and stream object end time information SOB_E_PTM.

Digital stream information SOB_STI 89*b* includes PROVIDER_INF storing additional information distributed in a stream.

Time map 89*c* includes the SOB starting address in the AV file and playback time SOBU_PB_TM of each stream object unit (SOBU). A stream object unit (SOBU) is the smallest access unit in a stream object (SOB), and is described below in detail.

A corresponding stream information table is thus defined for each AV stream by thus specifically defining the abstracted object information as shown in FIG. 8.

Figure 9:
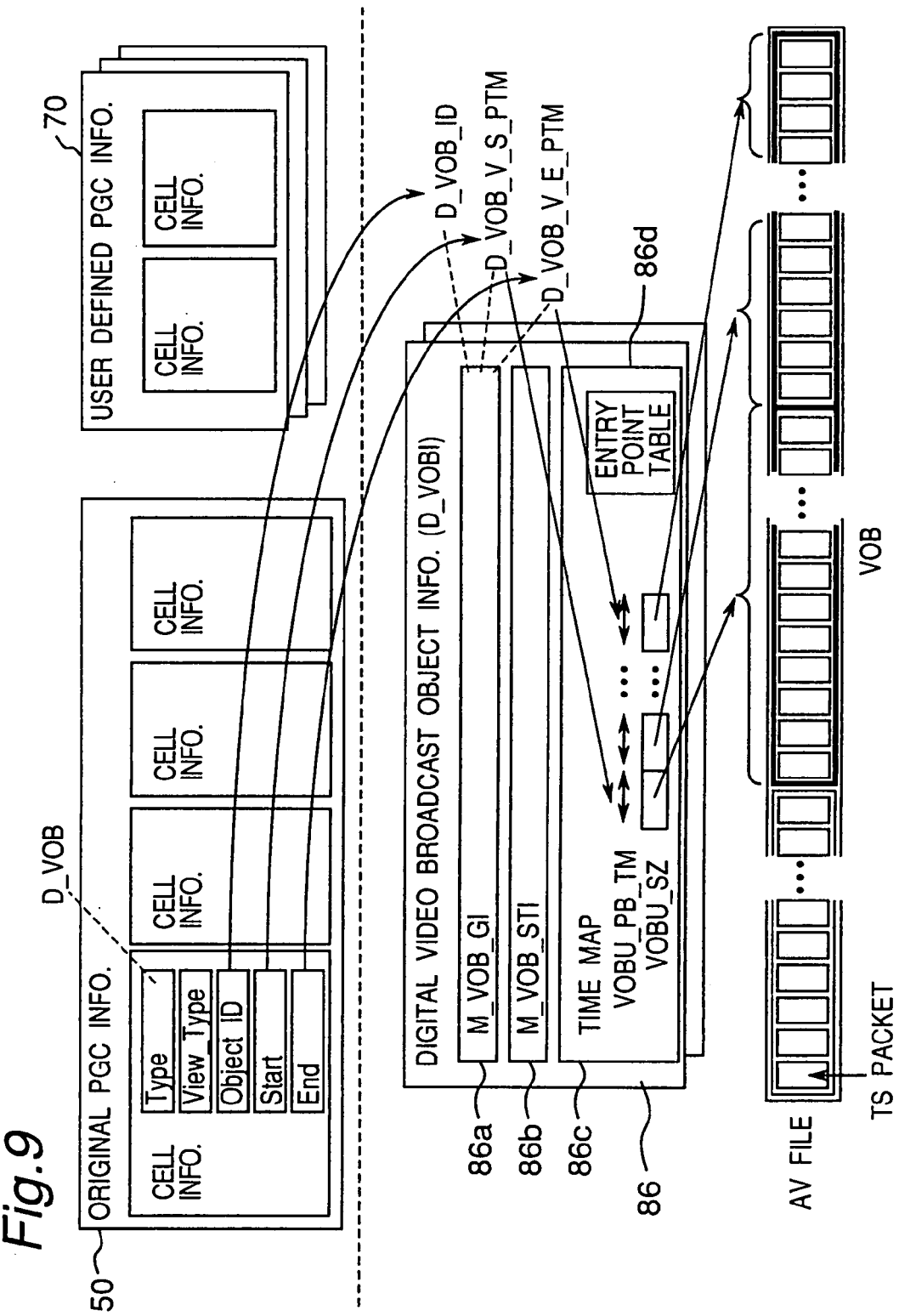
FIG. 9 is a relationship between a digital broadcast object (D_VOB), digital broadcast object information (D_VOBI), and PGC information.

The relationship between cell information 60 and digital video broadcast object information (D_VOBI) 86 as a specific example of object information ObjectI is described next with reference to FIG. 9.

Object type (Type) 60a declared in cell information 60 is set to D_VOB to indicate that the cell belongs to a digital broadcast object. Note that object type (Type) 60a is set to M_VOB for movie object cells and to SOB for stream object (SOB) cells.

If object type (Type) 60a is set to D_VOB, View_Type 60b is also declared in the cell information. View_Type 60b declares whether there are multiple views (further described below) in the cell and if there are how many views are present. If there are multiple views, View_Type 60b records the greatest number of view present, and records 0 if multiple views are not present. The object ID (Object ID) is used to search for the corresponding object information (VOBI). This is possible because, for example, the object ID (Object ID) for a digital broadcast object corresponds directly to the digital broadcast object identification information D_VOB_ID contained in general information D_VOB_GI 86a of the digital video broadcast object information (D_VOBI) 86. It is thus possible to find object information corresponding to cell information 60 using object type (Type) 60a and Object ID 60c information.

Starting position (Start) 60d field in cell information 60 corresponds to digital broadcast object starting time information D_VOB_V_S_PTM. If the value (time) recorded by Start and D_VOB_V_S_PTM are the same, it means that the cell is reproduced from the beginning of the digital broadcast object. If the Start value is greater than D_VOB_V_S_PTM, the cell starts from some midpoint in the digital broadcast object. In this case the cell is reproduced at a delay from the beginning of the digital broadcast object equal to the difference between D_VOB_V_S_PTM and Start values. The relationship between end position (End) 60e and digital broadcast object end time information D_VOB_V_E_PTM is the same.

It will thus be known that the cell playback start and end positions relative to the movie object time base can be determined from starting position (Start) 60d and end position (End) 60e values in cell information 60 and the digital broadcast object starting time information (D_VOB_V_S_PTM) and digital broadcast object end time information D_VOB_V_E_PTM in general information D_VOB_GI 86a of digital video broadcast object information (D_VOBI) 86.

Time map 86c of digital video broadcast object information (D_VOBI) 86 contains the playback time and data size of each video object unit (VOBU). The cell playback start and end times relative to the movie object can be converted to address values by referencing time map 86c. Note that a video object unit (VOBU) is a group of plural VOB packs in an AV file as indicated by the bold line in the figure. Note, further, that each pack is equal in size to a sector, and video data is stored using one or more packs.

A specific example of address conversion using this time map is described below with reference to FIGS. 10A to 10F.

FIG. 10A shows a digital broadcast object (D_VOB) presented as a video display on the time base. FIG. 10B shows a time map comprising a playback time length and data size for each video object unit (VOBU). FIG. 10C shows a digital broadcast object presented on the data amount of bit stream. FIG. 10D shows a part of the VOB system stream packs in a digital broadcast object (D_VOB). FIG. 10E shows the video stream and FIG. 10F shows the audio stream.

The digital broadcast object (D_VOB) is a MPEG transport stream. The MPEG transport stream contains video stream and audio stream packets (PES packets) arranged in a specific sequence of packs each containing plural packets (PES packets).

The transport packet (TS packet) is a fixed size of 188 bytes. One sector of a DVD-RAM disc stores 2048 bytes. Plural transport packets (specifically, 2048 bytes/188 bytes=10 TS packets) are recorded together with header information in one sector.

The transport stream is a single multiplexed stream comprising TS packetized video packets (V_PKT) and audio packets (A_PKT). Stream multiplexing is shown in FIGS. 10C to 10F.

The MPEG system stream, which includes both the transport stream and program stream, also contains a time stamp enabling simultaneous reproduction of the multiplexed video and audio streams.

The transport stream time stamp is the presentation time stamp (PTS) indicating the playback time of a particular frame. The digital broadcast object starting time information (D_VOB_V_S_PTM) and digital broadcast object end time information D_VOB_V_E_PTM are time expressions referenced to the presentation time stamp (PTS).

The video object unit (VOBU) is described next. The video object unit (VOBU) is the smallest access unit in a digital broadcast object (D_VOB). An MPEG video stream achieves highly efficient video compression by using both image compression based on the spatial frequency characteristic within a video frame (intra-coding), and image compression using movement between video frames (inter-coding), that is, movement along the time base. Time base information, that is, information about temporally preceding or following video frames, is therefore required to expand inter-coded video frames, which cannot be expanded using only information in the frame. To resolve this problem a common MPEG video stream improves random accessibility by inserting an intra-coded video frame (I-picture) coded without reference to movement on the time base is inserted once every approximately 0.5 sec.

A video object unit (VOBU) starts with a pack that starts with an I-picture and continues to the last pack immediately preceding the next pack starting with an I-picture. The time map contains the data size (number of TS packets) in the video object unit (VOBU) and the video frame playback time (number of fields) in the video object unit (VOBU).

Note that the first data in an I-picture is not necessarily the beginning of a TS packet. It is therefore possible that the last data in a particular video object unit (VOBU) is located in the same TS packet containing the first data in the next video object unit (VOBU). The data size of a video object unit (VOBU) is therefore the number of TS packets to immediately before the TS packet containing the first data for the next video object unit (VOBU) (I-picture).

Consider an example in which the difference between the cell Start value and the value recorded by digital broadcast object starting time information (D_VOB_V_S_PTM) is 1 second (60 fields). In this case the playback start time of each object unit from the beginning of the digital broadcast object (D_VOB) can be determined by accumulating the playback time of each video object unit (VOBU) in time map 86c. By likewise accumulating the data size (TS packet count) of each object unit it is also possible to determine the address of each object unit from the start of the digital broadcast object (D_VOB).

Figure 10:
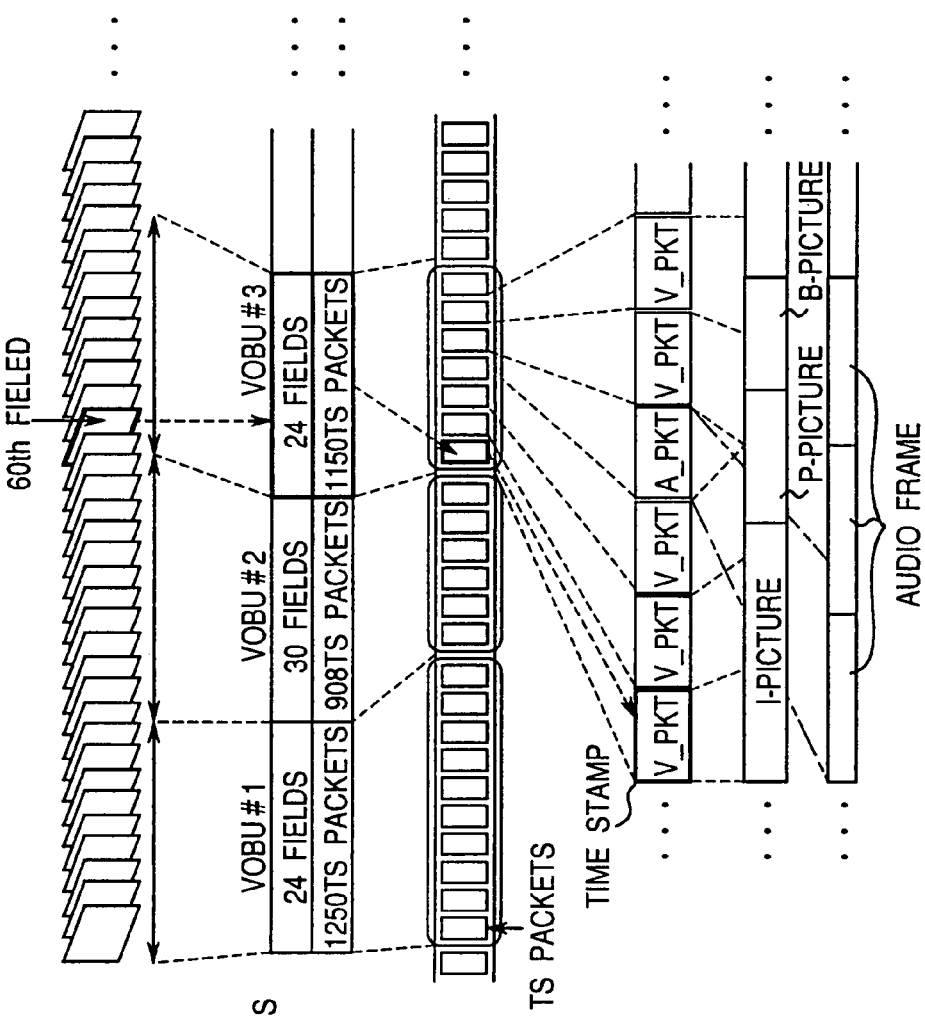
FIGS. 10A to 10F show a relationship of a time map according to the present invention.

Video object units (VOBU) containing 24, 30, and 24 fields, respectively, are sequentially arranged from the start of the digital broadcast object (D_VOB) in the example shown in FIG. 10. It is therefore known that the video frame starting 1 second (60 fields) from the beginning of the digital broadcast object (D_VOB) is contained in the third video object unit (VOBU #3). In addition, because the data size of the video object units (VOBU) is 1250, 908, and 1150 TS packets, respectively, from the beginning of the digital broadcast object (D_VOB), the start address of the third video object unit (VOBU #3) is known to be TS packet 2158 from the beginning of the object, that is, TS packet 8 in sector 215. It is therefore possible to determine the data start address from which playback begins by adding this result to the D_VOB start address (ADR_OFF) in the AV file, that is, sector 5010.

The above description assumes playback from the video frame of the sixtieth field from the start. As described above, decoding and playback cannot start from any desired video frame due to MPEG video coding requirements, and the playback starting position is therefore shifted to a nearest video object unit (VOBU) 6 fields away so that playback starts from the beginning of an I-picture. However, if the decoder only decodes those six fields and the fields are not presented, playback can start from the video field specified by the cell. The playback end time of a digital broadcast object corresponding to the cell end position and the address in the AV file can be obtained as described above.

An ID code identifying the broadcasting company and other information specific to each broadcaster is contained in the PROVIDER_INF field of the digital broadcast object stream information (D_VOB_STI).

The movie video object information M_VOBI is described next. The movie object information is also a subclass derived from the object information and is therefore basically the same as the digital broadcast object information. The big difference is that movie video objects M_VOB are recorded from terrestrial broadcast signals. That is, while digital broadcast objects (D_VOB) are produced by directly recording data transmitted from a digital broadcast satellite, movie objects are AV streams obtained by the recorder encoding the signal. Address conversion using the time map is the same as for digital broadcast objects (D_VOB) as described above.

For example, if one sector of a DVD-RAM disc stores 2048 bytes, M_VOB packets are also a fixed size of 2048 bytes. Movie video objects M_VOB can therefore be handled knowing that one pack equals one sector. The data read/write unit of a DVD-RAM disc is the sector, and movie object units can therefore be defined from sector to sector. Address conversion with reference to the time map is essentially the same as with D_VOB. Note that while VOBU data size is expressed by the packet count for digital broadcast objects (D_VOB), the time map for converting M_VOB addresses uses the number of packs.

The stream object information (SOBI) 89 is described next. The stream object information is also a subclass derived from the object information and is therefore basically the same as the digital broadcast object information. The big difference is that while the recorder can analyze the stream content with a digital broadcast object (D_VOB), the recorder cannot analyze the content of a stream object (SOB). The recorder encodes the data for both digital broadcast object D_VOB and movie video object M_VOB. The data structure of the stream is therefore knowable and can be analyzed by the recorder. With a stream object (SOB), however, the recorder records the data without analyzing it. Therefore, if the data is encrypted for copyright protection, for example, or if the recorder does not have a compatible decoder because of new services, the recorder will not understand the internal structure of the stream.

This means that a time map as described above cannot be generated for a stream object (SOB). This embodiment of the present invention addresses this problem by using the arrival time stamp (ATS) indicating the arrival time of each TS packet in the MPEG transport stream to create a time map.

Figure 11:
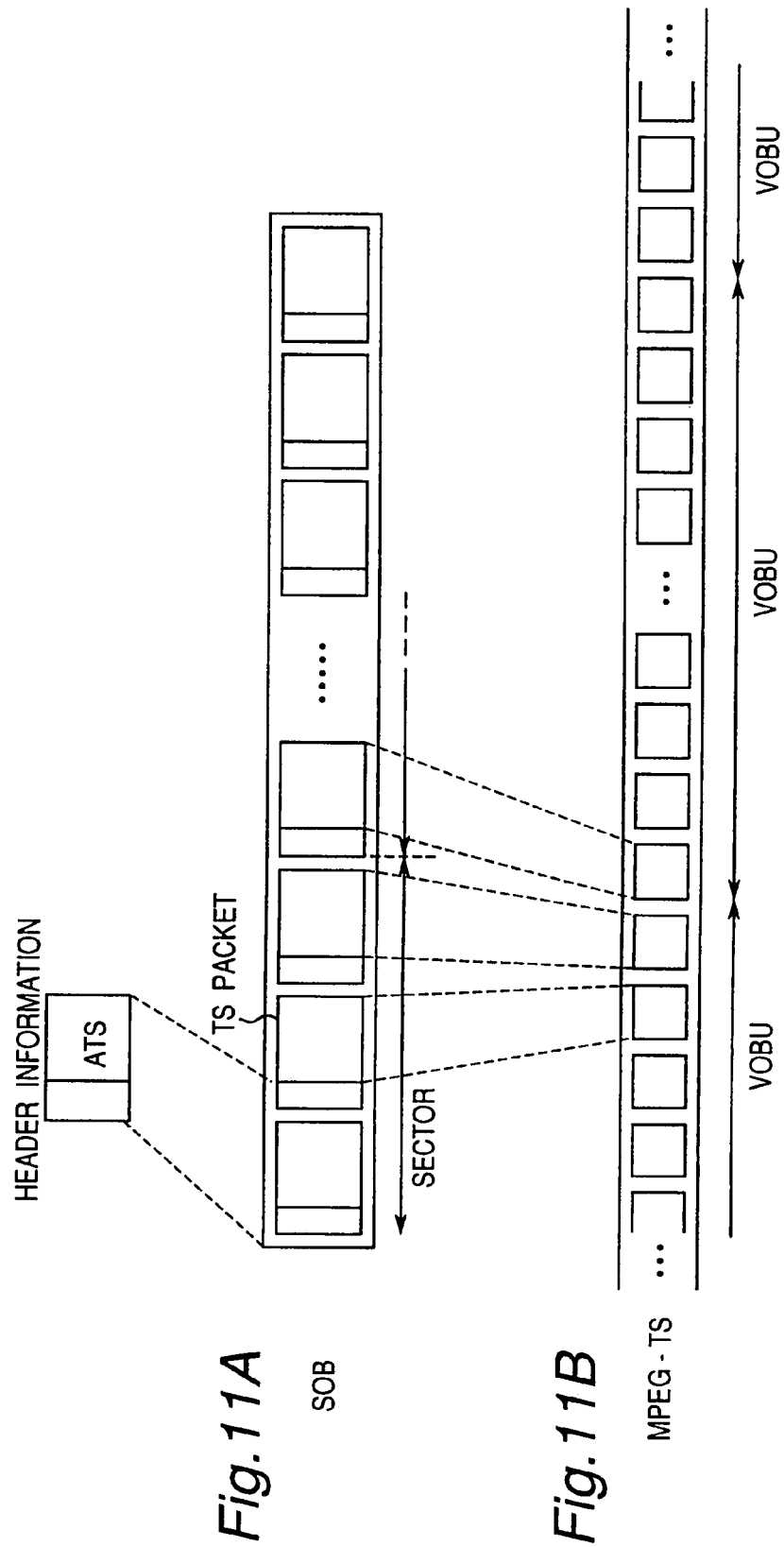
FIGS. 11A and 11B show a relationship between TS packets and header information in a stream object (SOB)

FIGS. 11A and 11B show the relationship between TS packet and header information in a stream object (SOB). Header information containing the arrival time stamp (ATS) and TS packets are disposed to alternating sectors in a stream object (SOB). The header information is 4 bytes and a TS packet is 188 bytes, and the present embodiment of the invention can therefore record 10 header information entries and TS packets in one sector. The arrival time stamp (ATS) can therefore be used to indicate a specific time in the stream object (SOB).

Objects in time map 89c (FIG. 8) of a stream object (SOB) are defined using stream object units (SOBU). Stream object (SOB) content cannot be analyzed, and the SOBU data size is fixed. SOBU data size in the present embodiment is the same size as an ECC block. By thus fixing the SOBU data size, it is not necessary to specify the size in the stream object (SOB) time map 89c. The time map is therefore a table containing only the arrival time stamp (ATS) of the first TS packet in the stream object unit (SOBU). The stream object starting time information SOB_S_PTM and stream object end time information SOB_E_PTM of a stream object (SOB) are the arrival time stamp (ATS) for the first and last TS packets in the object.

Address conversion using the time map is essentially the same as described with reference to a digital broadcast object (D_VOB). However, because the data size of each object unit (VOBU) in the stream object (SOB) is fixed, the time map used for SOB address conversion is not expressed by the packet count as in a digital broadcast object (D_VOB).

The time map can also be generated using the program clock reference (PCR) present in the TS packets of the MPEG transport stream instead of using the arrival time stamp (ATS). The program clock reference (PCR) indicates the input time for each TS packet to the decoder. The program clock reference (PCR) is not always written to every transport packet, and the recorder may therefore need to interpolate some PCR values.

As in the digital broadcast object stream information (D_VOB_STI), an ID code identifying the broadcasting company and other information specific to each broadcaster is contained in the PROVIDER_INF field of the stream object information S_VOB_STI.

Figure 12:
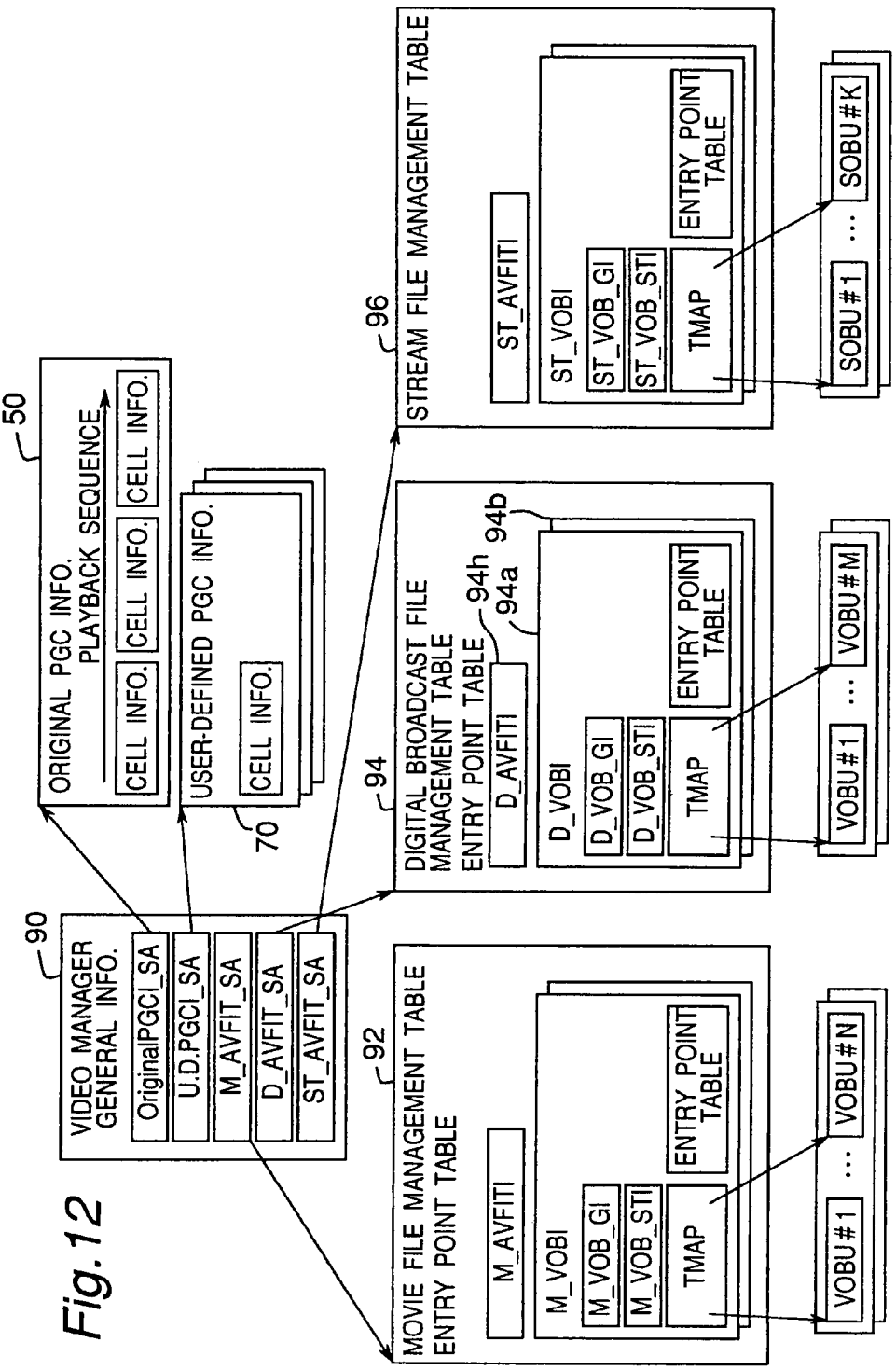
FIG. 12 is a structure of management information in a DVD-RAM disc.

FIG. 12 shows the overall structure of management information in an optical disc according to this embodiment of the invention. The data structure described above is shown in FIG. 12. The overall management information is described below. An optical disc according to this embodiment of the invention contains video manager general information (VMGI) 90 and various file information tables 92, 94, 96 in addition to the PGC information 50, 70 described above.

Video manager general information (VMGI) 90 is management information relating to the entire disc and includes the start address, that is, pointers, to original PGC information 50, user-defined PGC information 70, and file management tables 92 to 96, for example. PGC information 50, 70 and file management tables 92 to 96 can be accessed by referencing these pointers.

File management tables 92, 94, 96 shown in FIG. 12 are described next below. File management tables 92, 94, 96 are used for managing object data files and are provided for each object type. More specifically, movie file management table 92 is used for managing files recording digital broadcast object digital broadcast objects; digital broadcast file management table 94 is used for managing files recording video objects; and stream file management table 96 is used for managing stream files recording stream objects.

As described above object information is identified based on object ID (Object ID) of the cell information in the PGC information, and the object information address is determined using these file management tables 92, 94, 96. File management tables 92, 94, 96 therefore record the number of object information entries managed, the object ID (Object ID), and the data size of the object information. If the object ID indicates the order of the object information entries in the file, the object ID (Object ID) specified in the cell information can be used to determine the number of the specified object information entry in the object information managed by the file management table. The object information address can then be determined by calculating the offset from the start address of the file management table based on the file size and the sequence number of the object information.

As shown in FIG. 12 the digital broadcast file management table 94 is a table for managing digital broadcast files recording digital broadcast objects. Digital broadcast file management table 94 includes digital broadcast object information (D_VOBI) 94a, 94b, and table management information (D_AVFITI) 94h containing the number of digital broadcast object information entries managed by table 94 and the size of the digital broadcast objects. Digital broadcast object information equal to the number of entries indicated by table management information (D_AVFITI) 94h is consecutively recorded on the disc. As described above, digital broadcast object information (D_VOBI) 94a includes general information (D_VOB_GI), stream information (D_VOB_STI), time map, and entry point table. The time map contains the presentation time of each digital broadcast object unit (VOBU) and the size (VOBU_ENT). Note that the movie file management table (M_AVFIT) 92 recording movie objects and stream file management table (S_AVFIT) 96 recording stream objects have the same data structure as digital broadcast file management table 94.

Cell information is recorded to original PGC information 50 in the presentation sequence. The cell information includes the correlation to object information (Type and ObjectID) and the playback interval (Start and End) in the object. The playback information of the cell can be converted to an object address using the access map in the object information.

As noted above the data structure of the user-defined PGC information 70 is identical to the data structure of the original PGC information 50 except for whether or not an entry point table is included.

It will thus be known as described above that the playback control information, that is, PGC information, can be defined independently of information specific to the AV stream format by first abstracting the AV stream management information, and the AV streams can therefore be uniformly managed. This makes it possible to achieve an environment enabling the user to freely reproduce AV data without being specifically conscious of the AV format.

With the data structure defined above management information for new AV formats can be derived from the object information in the same way it is derived for existing AV formats. New formats can thus be easily integrated into the data structure.

The entry point table is described in detail next below.

An entry point is an access point enabling a user to start playback from a desired location in a broadcast program recorded on a disc. As shown in FIG. 7, for example, entry points related to original PGC information 50 are recorded to entry point table 80d in object information (ObjectI) 80, and entry points to user-defined PGC information 70 are recorded in the cell information for user-defined PGC information 70, such as in entry point table 72 in cell information 71.

An entry point is defined using the presentation time stamp (PTS) for a digital broadcast object (D_VOB) and movie video object (M_VOB) in the same way cell start and end positions are defined. An entry point for a stream object is defined using the arrival time stamp (ATS).

Entry points are set as follows.

Digital satellite broadcasts carry much information other than the AV stream. The AV stream for each program is identified from information recorded in a special program specific information (PSI) table in digital satellite broadcasts. The program specific information (PSI) and service information (SI) control transport stream reproduction. More specifically, the AV stream for one program is obtained by extracting the multiple TS packets for the particular program from the TS packets of the video and audio streams for the plural programs contained in the transport stream. The multiple TS packet sequence of the desired program can be identified using the packet ID (PID) added to each packet. Digital satellite broadcasts include data broadcasts and other interactive content, and can provide services that cannot be provided with conventional analog broadcasts.

One such digital broadcast feature is the multiple views (also referred to as multi-view) function whereby multiple temporary parallel views can be included in a single program. Multiple views are described in detail in ARIBTR-B15, and a data structure providing a multiple views feature is described briefly here with reference to FIG. 13. FIG. 13 shows the data structure of the event information table (EIT) enabling multiple views.

The component_group_id=0x0 table is referenced to when presenting the main view. The component_tag of the corresponding video stream is known to be V0 from the component_group_id=0x0 table. The Video_PID (=0x01) for component_tag=V0 is then determined by referencing the user presentation unit table, and the TS packet sequence having a PID=0x01 is known to be the corresponding stream. The audio stream for the main view is similarly known to be the TS packet sequence with a PID=0x02. These streams can then be decoded on a digital television to present the main view of a multi-view program to the user.

The AV stream of a digital broadcast thus contains much information other than the audio and video data. This added information includes information for data broadcasts enabling interactive viewing by the user, and parental control features whereby children can be prevented from viewing adult content. Data broadcast information is transmitted in a carousel fashion. With carousel transmissions the same data content stored for a particular time interval is repeatedly transmitted in file or smaller data units. The necessary data can be obtained when needed using carousel transmissions even though the data is broadcast in a one-way transmission because the same data is sent out repeatedly.

When viewing a data broadcast the required data can be obtained efficiently in a short time if the broadcast is captured from the beginning of the carousel. Efficient time-shift viewing is also possible if the broadcast can be reproduced while skipping those parts blocked to children using the parental control feature.

Users often access a program at these transition points. This means that if these transition points are defined as entry points, users can efficiently access programs recorded on the optical disc. These entry points can be automatically detected and automatically set by the recorder.

Users also often desire to set entry points to particular scenes. Entry points set by the user are, from the user's perspective, distinct from the entry points set automatically by the recorder. Simultaneously displaying both entry point types on the same screen therefore makes entry point selection confusing, and a data structure whereby these different types of entry points can be identified is needed.

This invention enables distinguishing automatically set entry points and user-defined entry points by defining specific attributes for each entry point. FIG. 14 is an entry point table whereby attributes can be defined for each entry point. This entry point table has a USER_EP flag field which can be set to declare if a particular entry point was defined by the user. The USER_EP flag can be set to 1 for a user-defined entry point, and to 0 for an original entry point, for example. The recorder or player can therefore simply reference this USER_EP flag to clearly indicate for the user whether a particular entry point was defined by the user.

The entry point table also includes the following fields for each entry point: PG_Change indicating a program change; PSI_SI indicating a change in the PSI/SI information of the transport stream; SQH_Change indicating a change in an attribute of the MPEG stream in the transport stream; Data_Top indicating the starting point of the data carousel; Data_Change indicating the location of a change in data carousel content; PMT_Change indicating the location of a change in PMT content; DE_Change indicating the location of a data event update; Module_Change indicating the location of a module update; Aud_Change indicating an audio attribute change; Multi_View indicating the number of views in a program for multi-view compatibility; and a parental control field (for restricting viewing content available to children). The entry point table also contains links to files other than the management information and AV streams on the optical disc for each entry point. For digital broadcast objects (D_VOB) and movie video objects (M_VOB), this link information is the PTS for the entry point, and for stream objects is the ATS.

When the user sets an entry point, the recorder can present all entry points and the corresponding attributes (PG_Change, PSI_SI, SQH_Change, Data_Top, Data_Change, PMT_Change, DE_Change, Module_Change, Aud_Change, Multi_View field, and parental control field) for the user regardless of whether the USER_EP flag is set. By referencing the displayed entry points and attributes, the user can mark the entry points needed for user editing. If a marked entry point is set by the recorder, the recorder sets the USER_EP flag (=1). If the user re-marks an entry point previously set by the user, the USER_EP flag is already set to 1 and remains set.

The user may also set an entry point to a location that is not automatically detected. In this case the user must operate the recorder to select the desired scene and then set the entry point. The USER_EP flag for this entry point is set to 1 when the recorder registers the entry point in the entry point table.

The recorder presents only those entry points for which the USER_EP flag is set to the user when the PGC is edited. This enables the user to select only the entry points needed to edit the PGC without being confused by entry points detected because they are automatically set.

Providing entry point table 80d in object information (ObjectI) 80 is sufficient if the entry point table is as shown in FIG. 14. However, the entry point table can be separately set in user-defined PGC information 70 (FIG. 7) as described above, in which case it can be included or not included in the cell information.

Figure 15:
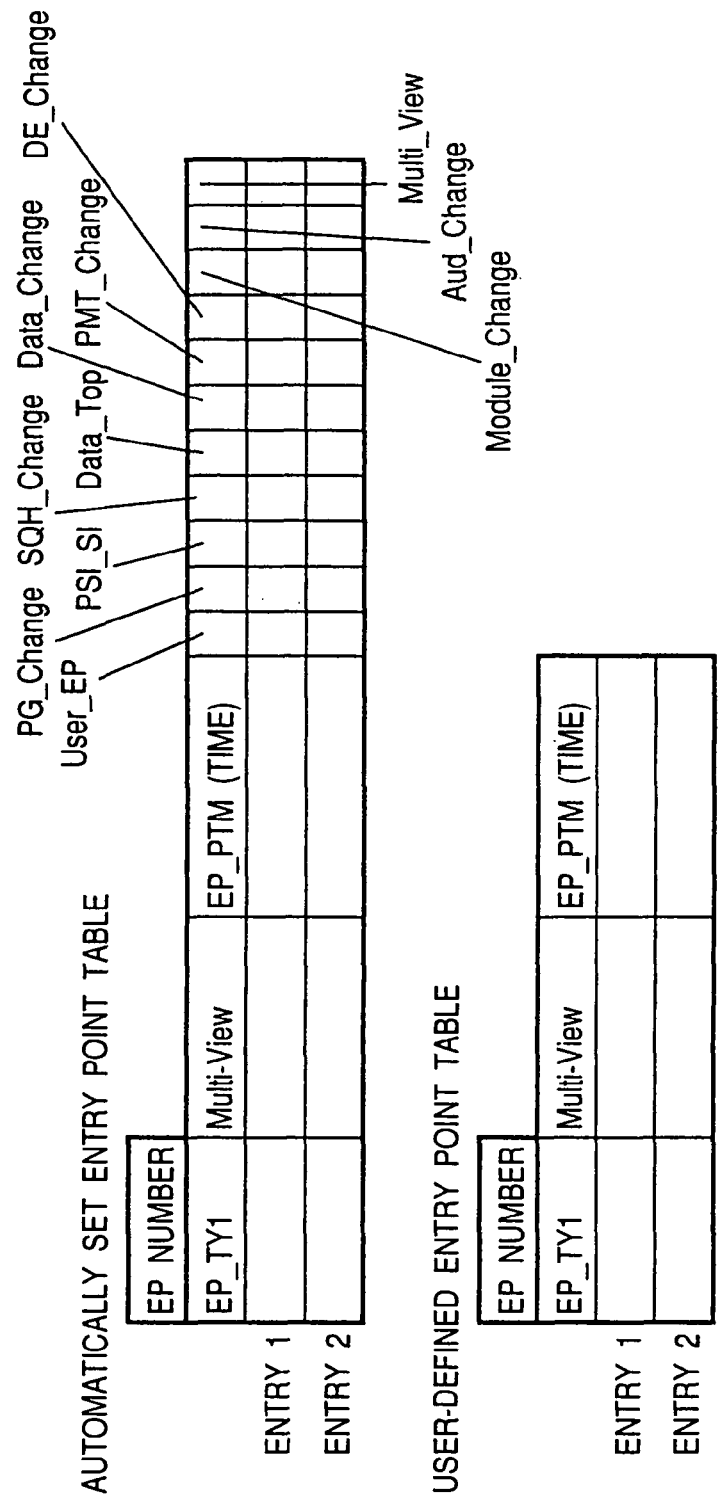
FIG. 15 is structures of an automatically defined entry point table and a user-defined entry point table.

Automatically set (original) entry points and user-defined entry points can be distinguished by managing them using separate tables as shown in FIG. 15. FIG. 15 shows an automatically set entry point table and user-defined entry point table. Entry points are set automatically only during recording by the recorder and the table of automatically set entry points is therefore written only to the original PGC information. The entry point attributes described above are recorded in this table. The user-defined entry point table is written in the cell information of user-defined PGC information 70 (FIG. 7). Note that the table of automatically set entry points can be written to original PGC information 50 (FIG. 7) instead of to object information (ObjectI) 80 (FIG. 7).

It is also possible to provide an entry point table for each view in a multi-view stream. FIG. 16 shows entry point tables for plural views. This enables entry points to be easily managed by view. It will be obvious that fields for recording entry point attributes can be included in each of these entry point tables.

Figure 17:
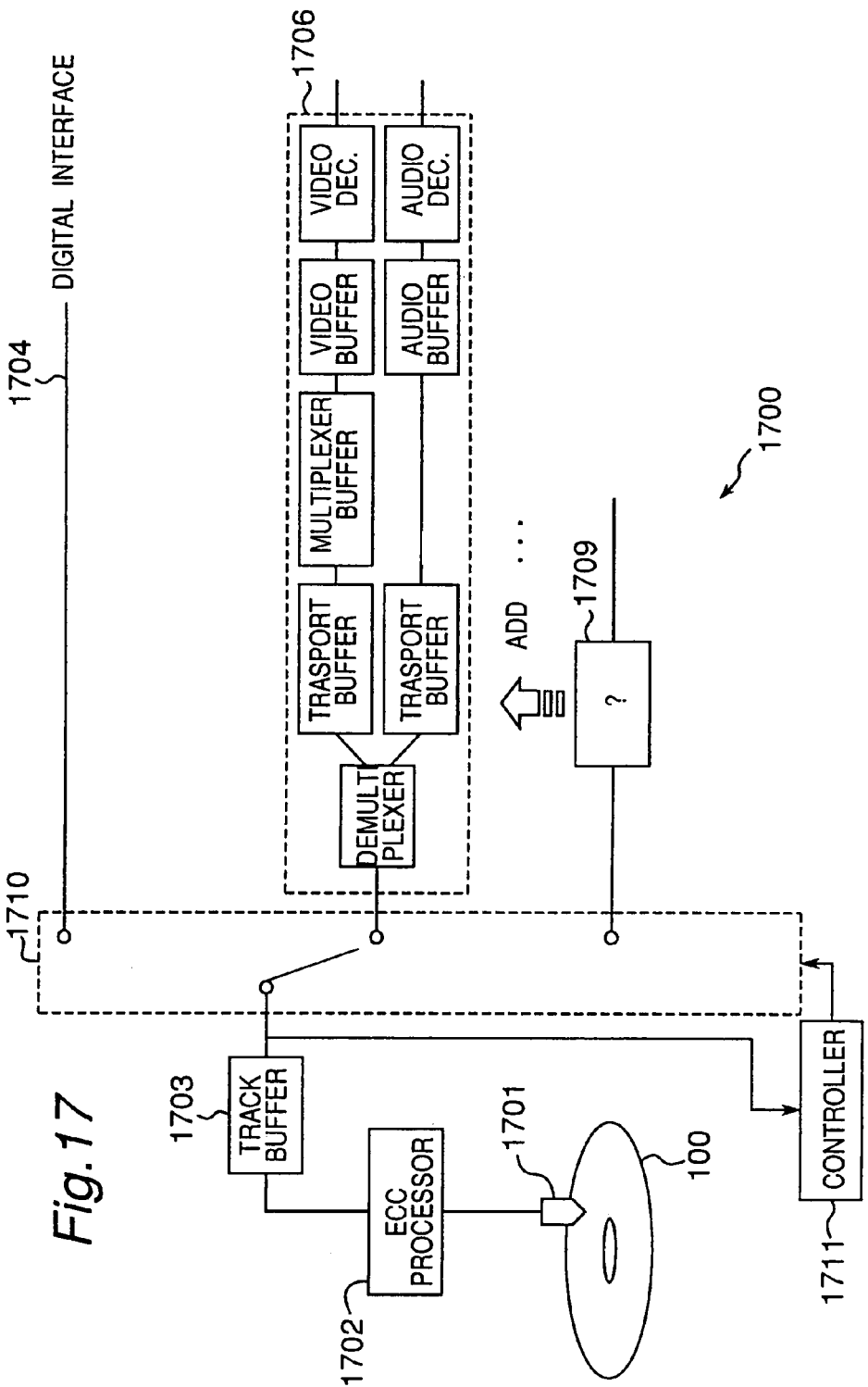
FIG. 17 is a block diagram of a model player according to the present invention.

A model player for reproducing an optical disc according to the present invention is described next below with reference to FIG. 17. As shown in FIG. 17 this player 1700 has an optical pickup 1701 for reading data from disc 100, ECC processor 1702 for error correction processing the read data, track buffer 1703 for temporarily storing the read data after error correction, TS decoder 1706 for reproducing a transport stream containing a movie video object (M_VOB) or digital broadcast object (D_VOB), for example, and a controller 1711 for controlling the various parts of player 1700.

Player 1700 also has a digital interface 1704 for externally storing AV streams. This enables AV streams to be supplied to an external device using the IEEE-1394, IEC-958, or other communications protocol. If the AV stream contains a new AV format, for example, this enables the AV stream to be output through digital interface 1704 to an external AV device without passing the internal decoder of player 1700 so that the new AV format stream can be reproduced using the external AV device. For player 1700 to support the new AV format it is only necessary to also provide a decoder 1709 compatible with the new AV format connected to track buffer 1703 in the same way as other decoder(s).

The playback operation of player 1700 is described next. Using optical pickup 1701, player 1700 reads data recorded on disc 100. ECC processor 1702 ECC processes the read data and outputs transport stream (TS), which is stored to track buffer 1703. If the transport stream (TS) is decodable, controller 1711 drives selector 1710 to connect track buffer 1703 and TS decoder 1706. TS decoder 1706 separates and decodes the video data and audio data encoded in the transport stream (TS), and then outputs the decoded video and audio data. If controller 1711 determines that the transport stream (TS) cannot be decoded, the transport stream (TS) can be decoded by providing a decoder 1709 compatible with the new AV format.

The configuration and operation of a DVD recorder for recording data to an optical disc as described above is described next with reference to FIG. 18. This DVD recorder can also play back data recorded on the optical disc, and the playback operation is therefore also described below.

Figure 18:
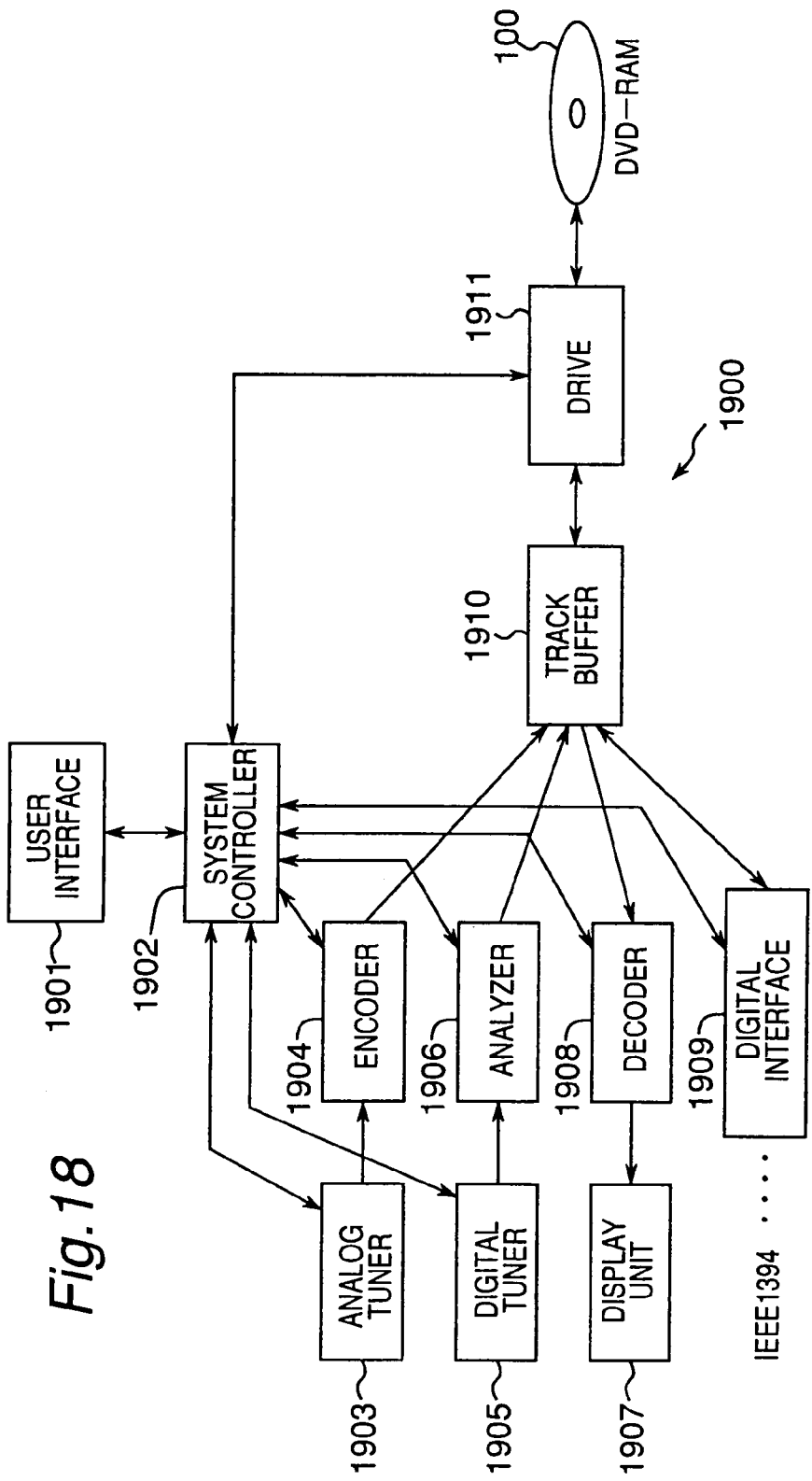
FIG. 18 is a block diagram of a DVD recorder.

As shown in FIG. 18 this DVD recorder 1900 has a user interface 1901, system controller 1902, analog tuner 1903 for receiving VHF and UHF signals, encoder 1904, digital tuner 1905 for receiving data streams from digital satellite broadcasts, analyzer 1906, display unit 1907 such as a television and speakers, and decoder 1908 for decoding the AV stream.

The user interface 1901 is used to present information to the user and receive user requests (input). System controller

1902 handles the overall management and control of DVD recorder 1900. Encoder 1904 converts analog signals to digital signals, and encodes the digital signals to an MPEG transport stream. Analyzer 1906 analyzes streams (such as the MPEG transport stream) containing coded digital data. Decoder 1908 includes TS decoder 1706 shown in FIG. 17 and any additional decoders 1709.

DVD recorder 1900 also has a digital interface 1909, track buffer 1910 for temporarily storing data written to DVD-RAM, and a drive 1911 comprising a motor for rotationally driving DVD-RAM disc 100, a laser for writing data to DVD-RAM disc 100, and an optical pickup. Digital interface 1909 is for outputting data to an external device using a communications protocol such as IEEE-1394.

User interface 1901 of DVD recorder 1900 receives requests from the user first, and passes the user request to system controller 1902. System controller 1902 interprets the user request and sends process requests to the appropriate modules.

Figure 19:
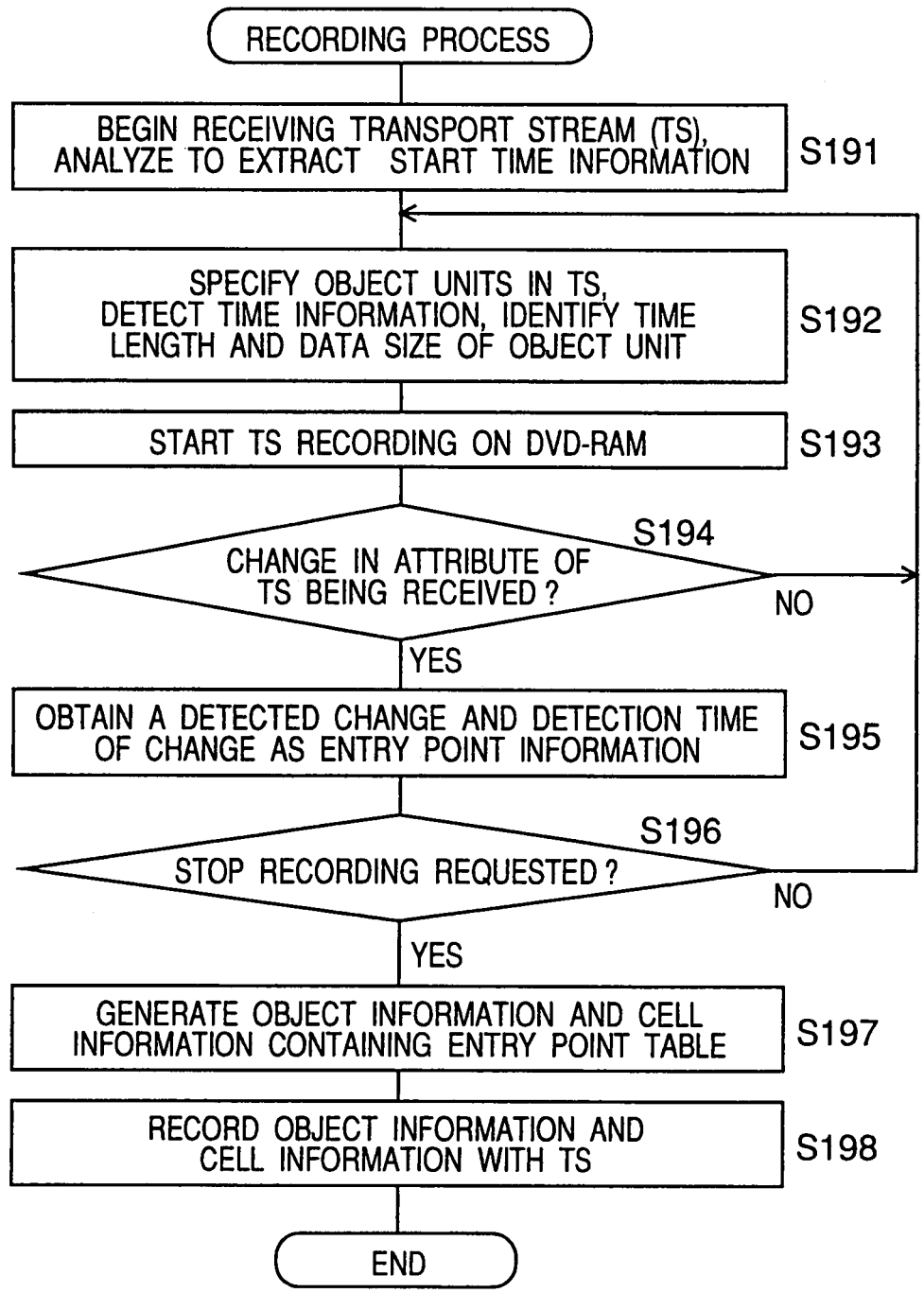
FIG. 19 is a flow chart of the recording operation of the DVD recorder.

Operation when the user request is to record a digital broadcast is described next with reference to FIG. 19. FIG. 19 is a flow chart of the recording process of DVD recorder 1900 shown in FIG. 18.

The digital broadcast recording request from the user is passed through the user interface 1901 to system controller 1902. System controller 1902 then instructs digital tuner 1905 to receive the digital broadcast, and instructs analyzer 1906 to interpret the data in the MPEG transport stream. Analyzer 1906 extracts the digital broadcast object starting time information (D_VOB_V_S_PTM) as the information needed to generate the digital broadcast object information (D_VOBI) from the MPEG transport stream, and passes D_VOB_V_S_PTM to system controller 1902 (step S191).

Analyzer 1906 also specifies and separates the object units (VOBU) from the MPEG transport stream, and sends the time length and size of the object units required to generate the time map to system controller 1902 (step S192). Note that an object unit (VOBU) is determined by detecting I-pictures in the transport stream.

The MPEG transport stream passed from digital tuner 1905 is transferred through analyzer 1906 to track buffer 1910. System controller 1902 outputs a write request to drive 1911, and drive 1911 thus gets the data stored to track buffer 1910 and records it to DVD-RAM disc 100 (step S193). System controller 1902 also tells drive 1911 where to write the data to the disc based on the file system allocation data.

In addition to detecting object unit time information, analyzer 1906 also monitors the MPEG transport stream being received to detect attribute changes (step S194). A specific detection method is described below with reference to a digital broadcast delivered via broadcast satellite. To accomplish this the recorder has memory sufficient to store enough received data to detect a change in any of the following data fields (a) to (k).

It will be noted that the following detection method is just an example and may not conform in part to the ARIB-defined data structure. It will be obvious that detection is also possible using a data structure conforming to ARIB standards.

Figure 20:
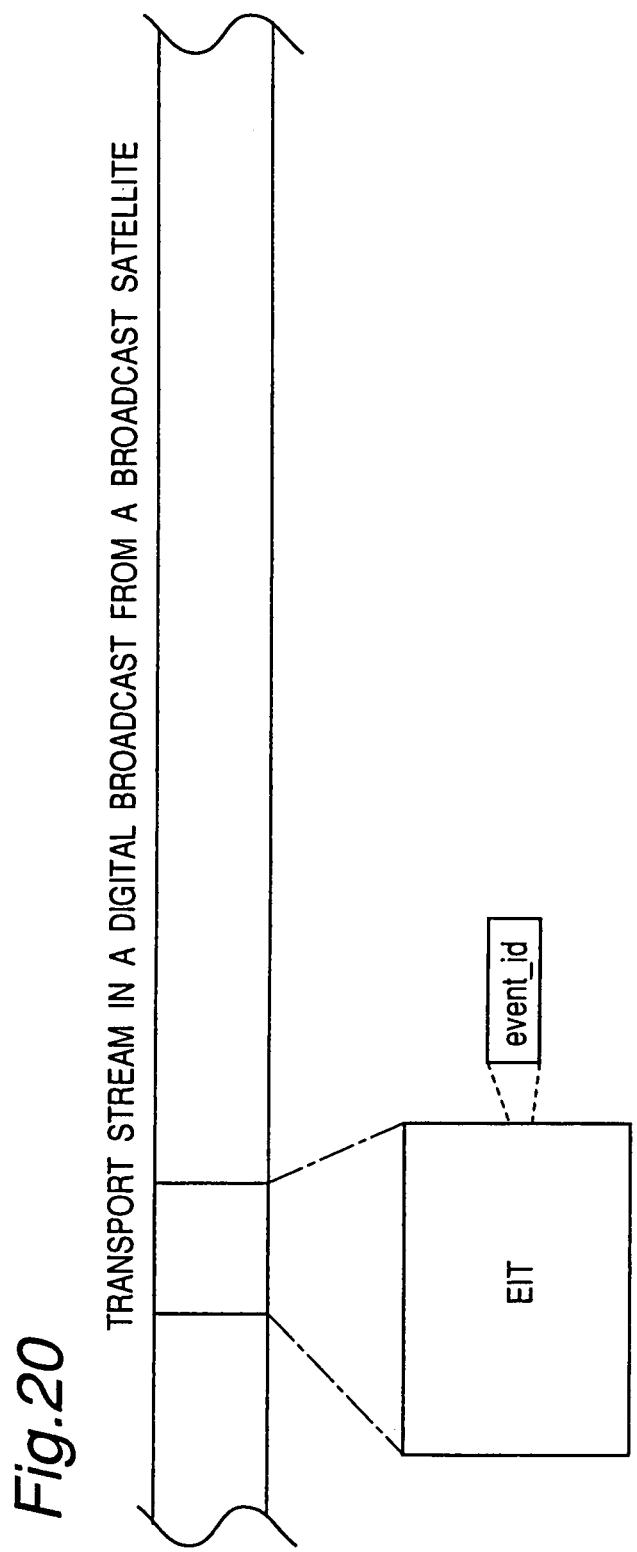
FIG. 20 is a structure of an EIT for PG_Change detection.
Figure 21:
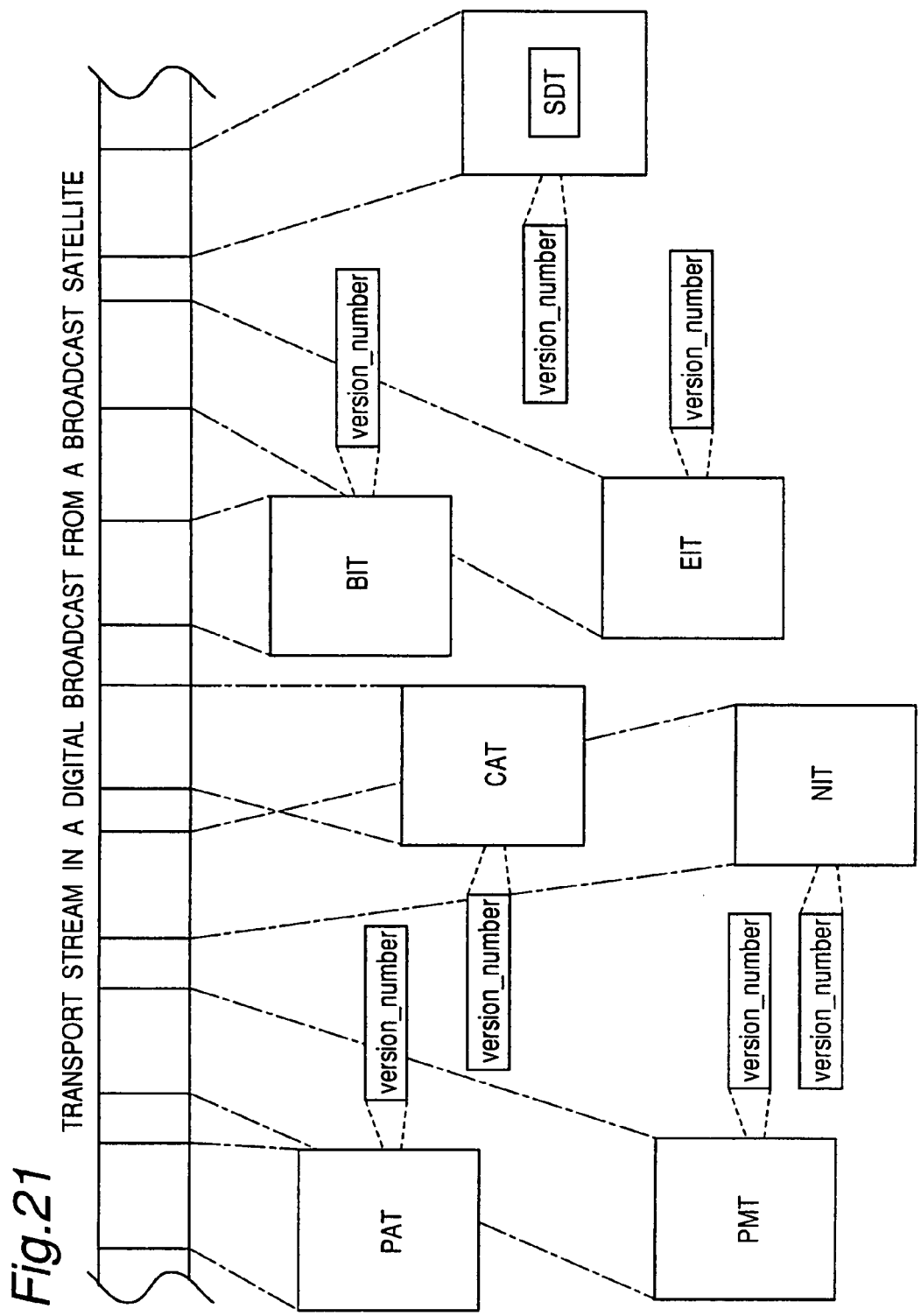
FIG. 21 is a structure of PSI/SI information for PSI/SI detection.
Figure 22:
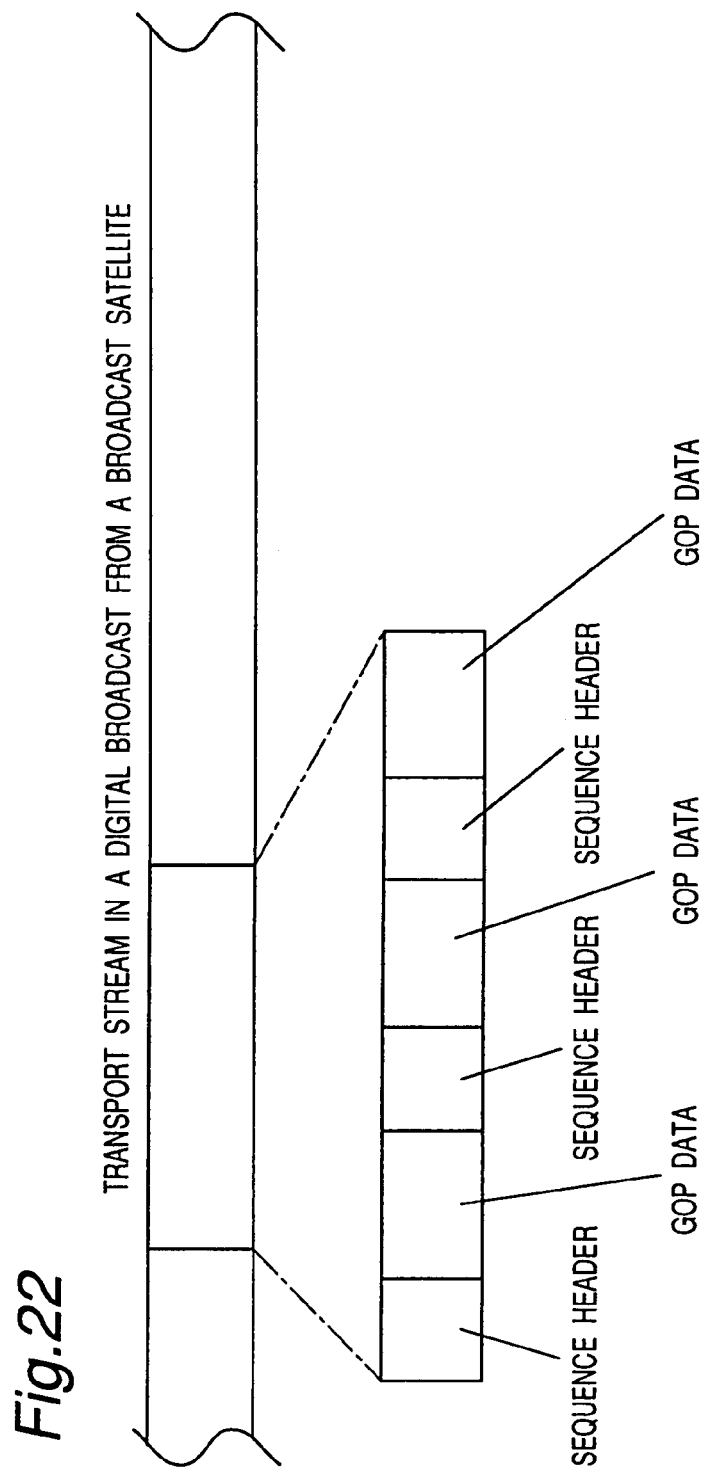
FIG. 22 is a structure of an MPEG-2 stream for SQH_Change detection.
Figure 23:
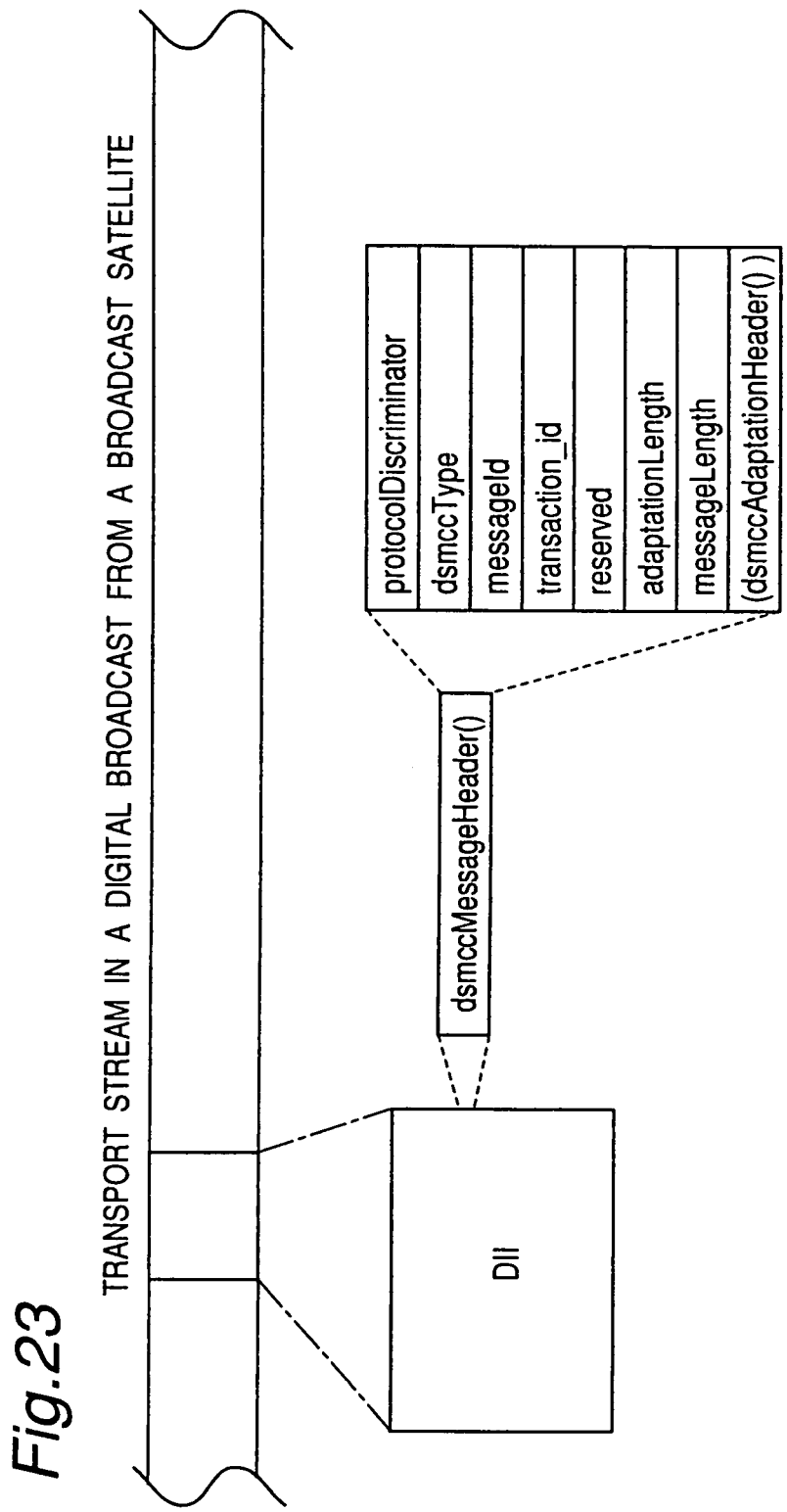
FIG. 23 is a structure of a DII for Data_Top detection.
Figure 24:
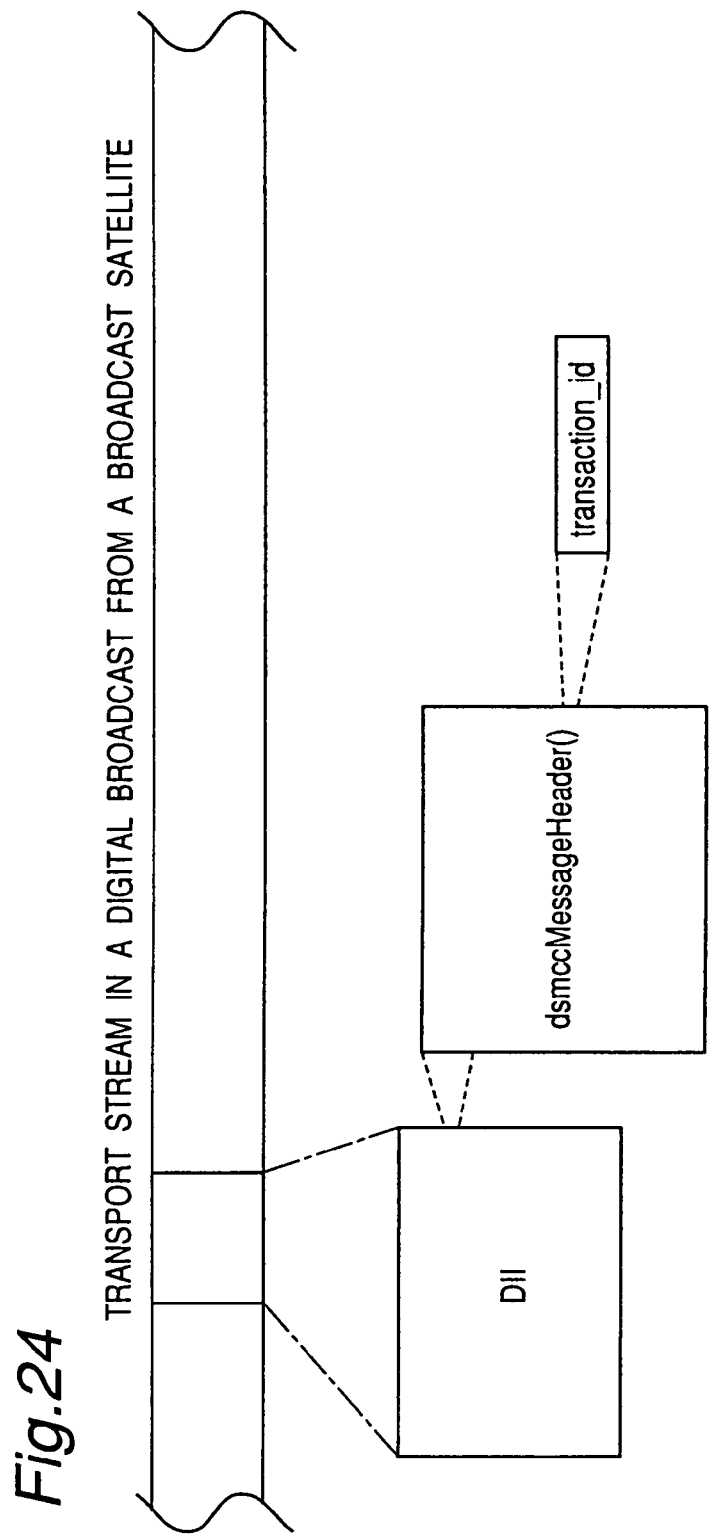
FIG. 24 is a structure of a DII for Data_Change detection.
Figure 25:
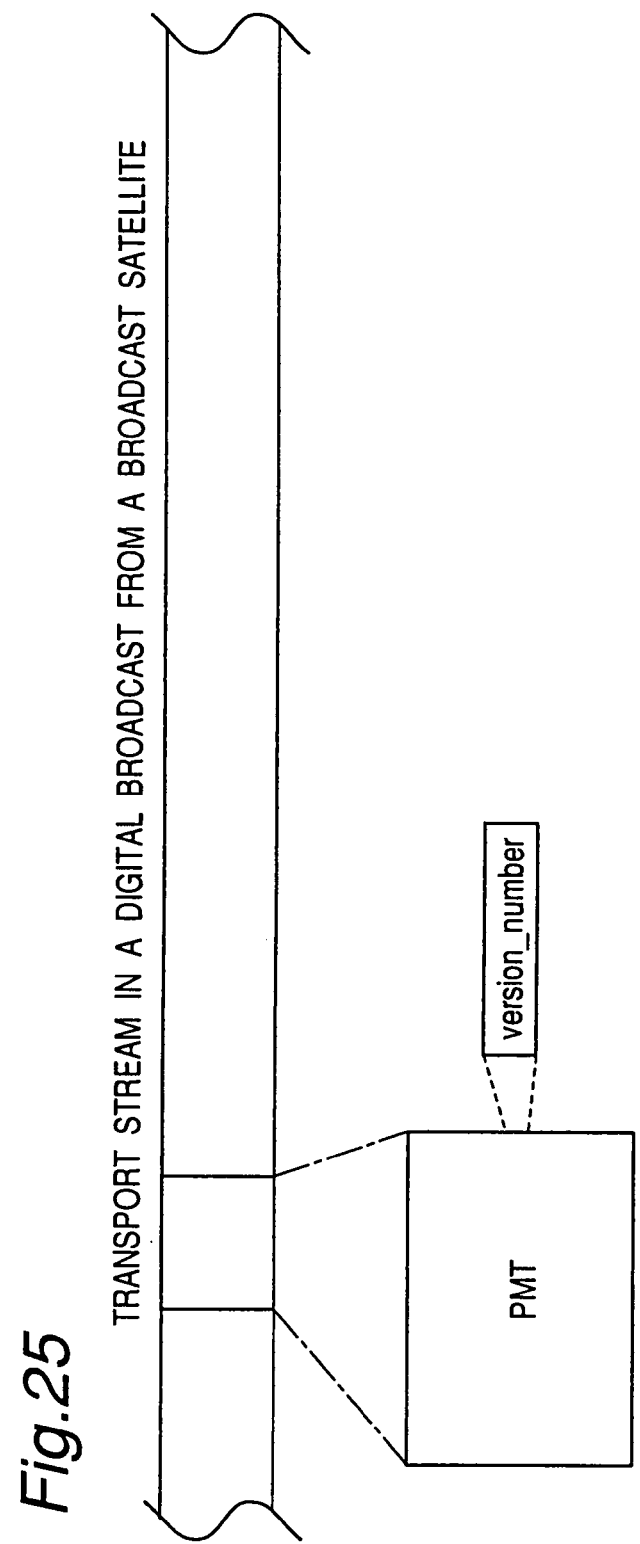
FIG. 25 is a structure of a PMT for PMT_Change detection.
Figure 26:
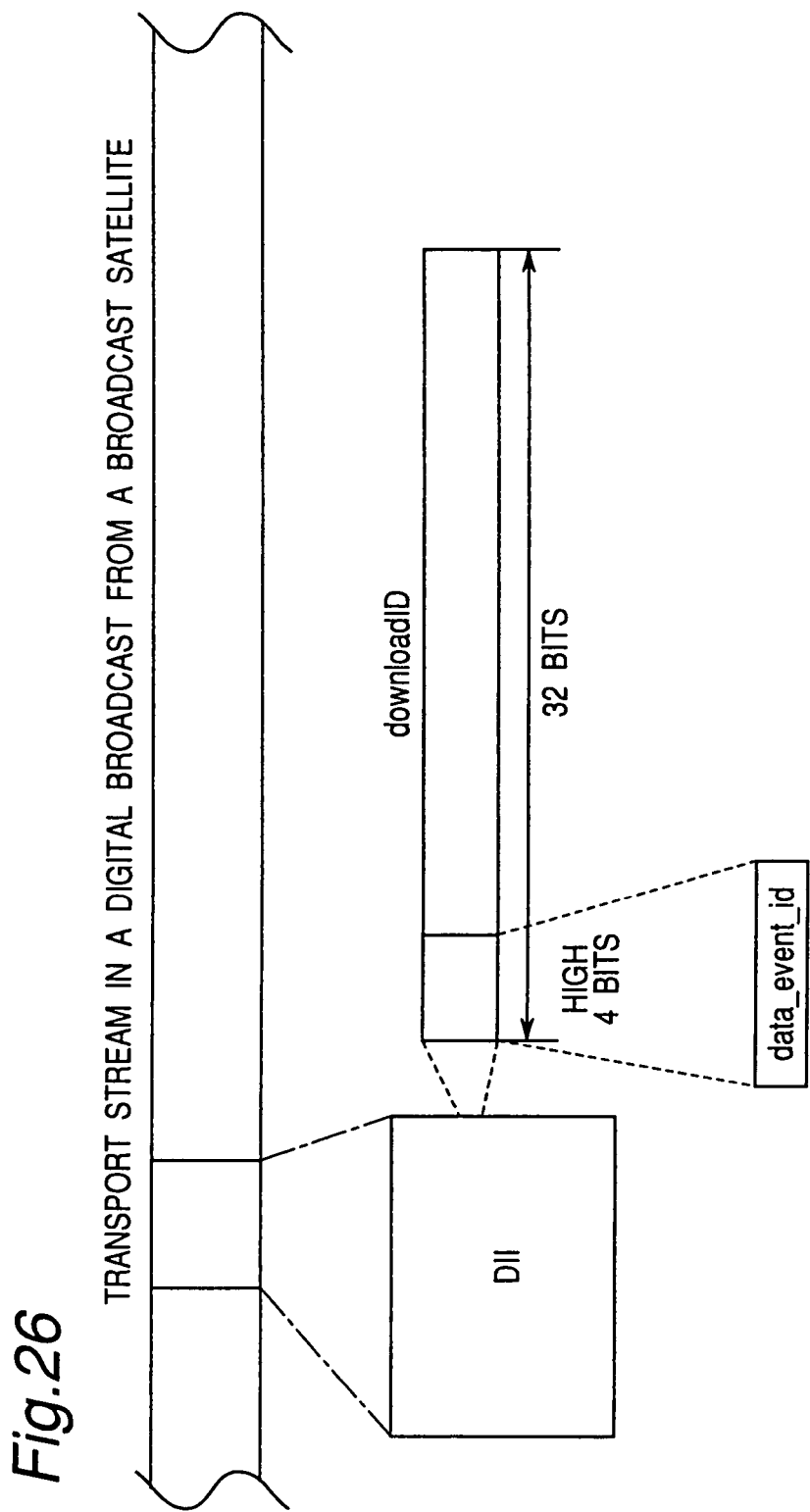
FIG. 26 is a structure of a DII for DE_Change detection.
Figure 27:
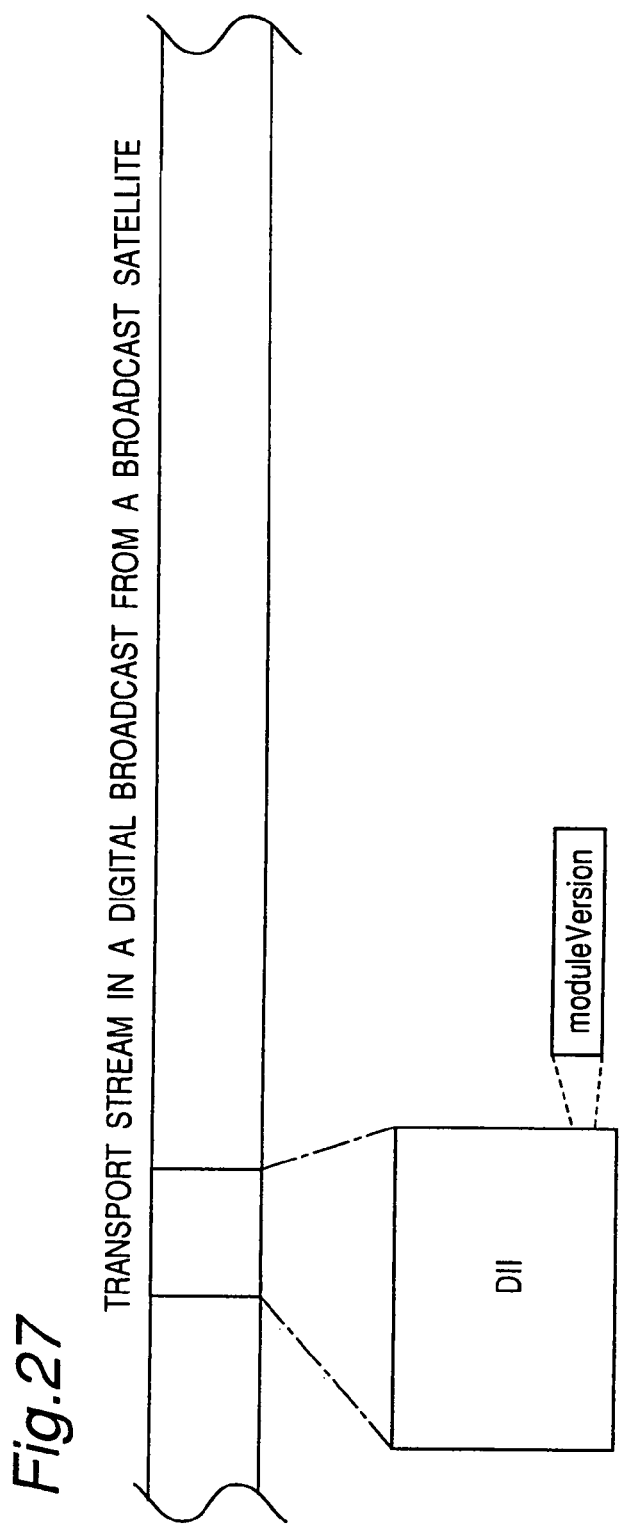
FIG. 27 is a structure of a DII for Module_Change detection.
Figure 28:
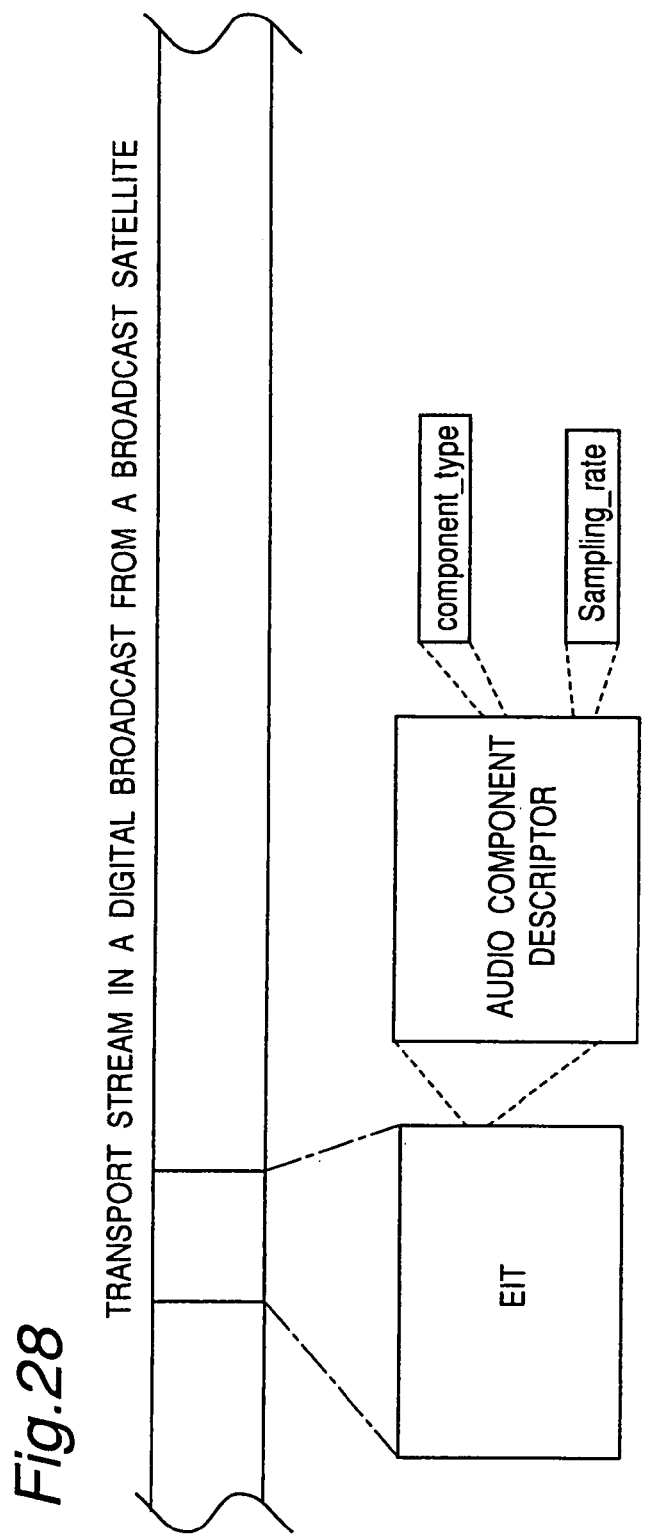
FIG. 28 is a structure of an EIT for Aud_Change detection.
Figure 29:
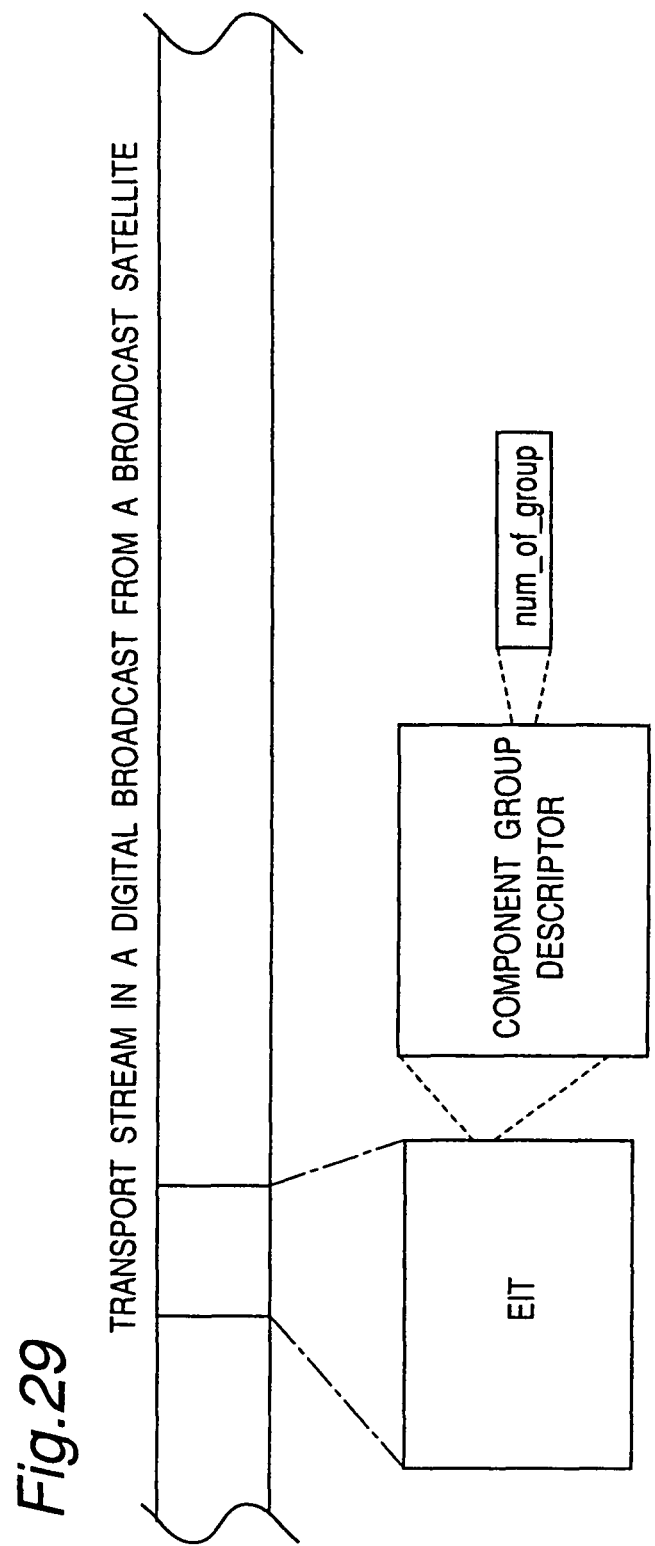
FIG. 29 is a structure of an EIT for Multi-View detection.
Figure 30:
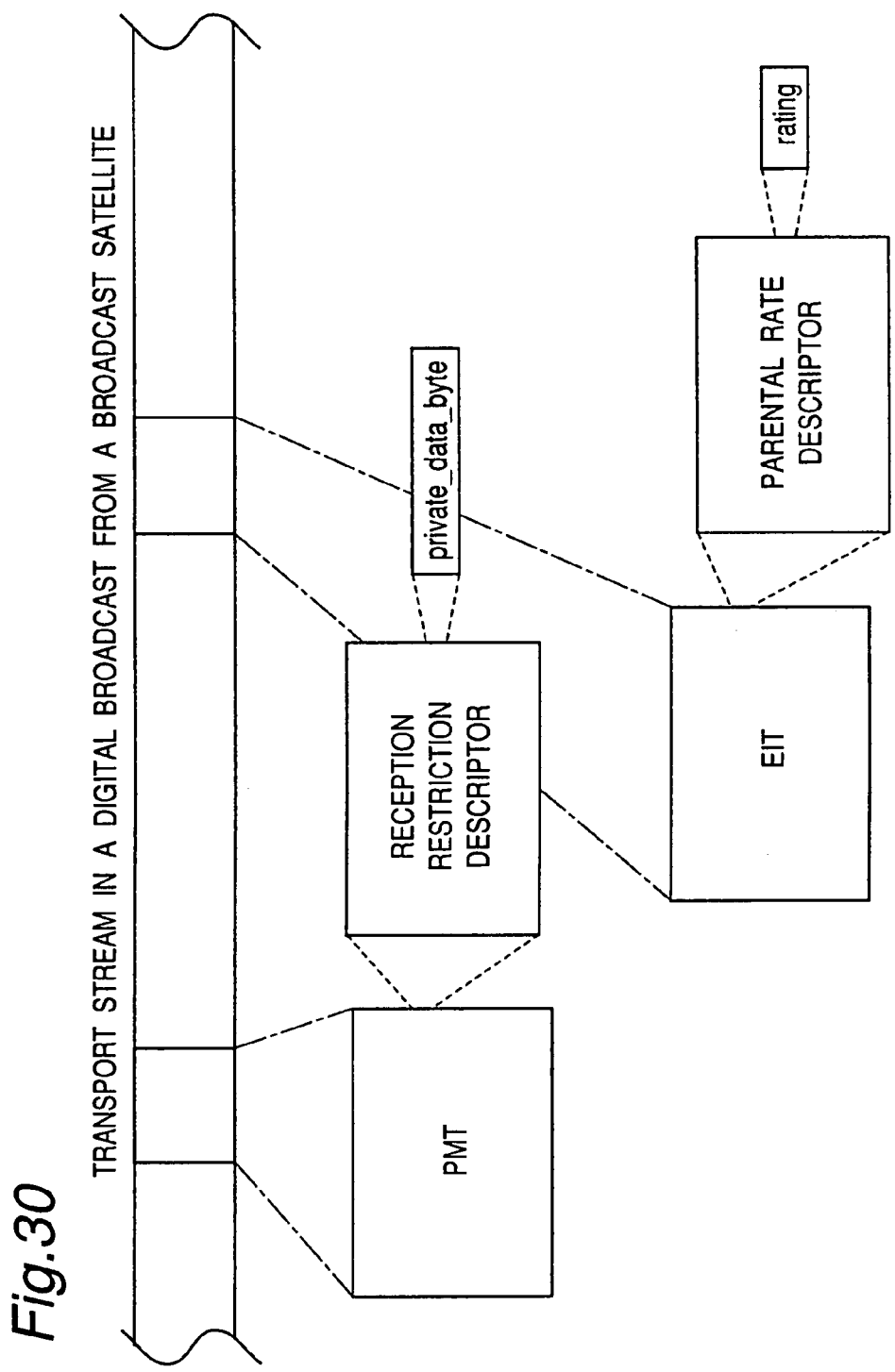
FIG. 30 is a structure of a PMT and EIT for parental control information detection.

(a) PG_Change: added when there is a change in the event_id (FIG. 20) in the digital broadcast stream EIT (Event_Information_Table);

(b) PSI_SI: added when there is a change in the version_number of a table (including the PAT (Program_Association_Table), CAT (Conditional_Access_Table), NIT (Network_Information_Table), BIT (Broadcaster_Information_Table), SDT (Service_Description_Table), or EIT (Event_Information_Table), see FIG. 21) in the PSI/SI information of the digital broadcast stream; (c) SQH_Change: added when there is a change in the sequence header information (FIG. 22) of an MPEG-2 stream in the digital broadcast stream;

(d) Data_Top: added when dsmccMessageHeader( ) (FIG. 23) is detected in the DII (DownloadInfoIndication) in the digital broadcast stream;

(e) Data_Change: added when a change is detected in the transaction_id (FIG. 24) in the dsmccMessageHeader( ) in the DII of the digital broadcast stream;

(f) PMT_Change: added when a change is detected in the version_number (FIG. 25) of the PMT (Program_Map_Table) in the digital broadcast stream;

(g) DE_Change: added when a change is detected in the data_event_id (FIG. 26) in the downloadID in the DII message of the digital broadcast stream;

(h) Module_Change: added when a change is detected in the module_version (FIG. 27) in the DII message in the digital broadcast stream;

(i) Aud_Change: added when a change is detected in the component_type or the sampling_rate (FIG. 28) in the audio component descriptor in the EIT of the digital broadcast stream;

(j) Multi_View field: assigned according to the num_of_group (FIG. 29) field in the component group descriptor in the EIT of the digital broadcast stream; and (k) parental control field: assigned according to the setting of the private_data_byte of the restricted reception descriptor in the PMT of the digital broadcast stream, or the rating field of the parental rate descriptor in the EIT (Event_Information_Table) (FIG. 30).

Referring again to FIG. 19, if the analyzer 1906 detects a change in the MPEG transport stream content, it sends detection information together with the detection time to system controller 1902 as entry point data (step S195). System controller 1902 generates the entry point table, which is a collection of entry point data.

When to stop recording is determined by a stop request from the user (step S196). A user request to stop recording is applied through user interface 1901 to system controller 1902. System controller 1902 then sends a stop instruction to digital tuner 1905 and analyzer 1906. If the user does not stop recording, process repeats from step S192 and recording thus continues.

Analyzer 1906 stops analyzing the received data when it receives a stop analyzing instruction from system controller 1902, and sends the end presentation time (D_VOB_V_E_PTM) of the last analyzed video object unit (VOBU) in the MPEG transport stream.

After the digital broadcast reception process ends system controller 1902 generates the digital broadcast object information (D_VOBI) based on the data received from analyzer 1906, and then generates cell information for the digital broadcast object information (D_VOBI). The Type field of the cell information is set to "D_VOB" in this case. The system controller 1902 also generates an entry point table from the entry point data received from the analyzer 1906 (step S197). The system controller 1902 also sets the ViewType of the recorded cell based on the entry point data.

After completing recording the data accumulated in track buffer 1910 to drive 1911, system controller 1902 controls drive 1911 to record the digital broadcast object information and cell information. Drive 1911 thus writes the remaining data in track buffer 1910, the digital broadcast object information (D_VOBI), and cell information to DVD-RAM disc 100, and the recording process ends (step S198).

The same basic process is used when the user request is to record an analog broadcast. The processes differ in that encoder 1904 encodes the content to a transport stream and the VOBUs are therefore generated by the recorder.

The same basic process is also used when the user request is to record a data stream. The processes differ in that stream objects (SOB) cannot be analyzed and the arrival time stamp (ATS) is therefore used for the time values.

Operation based on user-defined recording start and stop requests is described above. However, it will also be noted that the basic operation of the DVD recorder 1900 is the same even when making timer recordings such as made with conventional VCR machines. Operation in this case differs only in that the system controller automatically issues the recording start and stop requests instead of the user.

Figure 31:
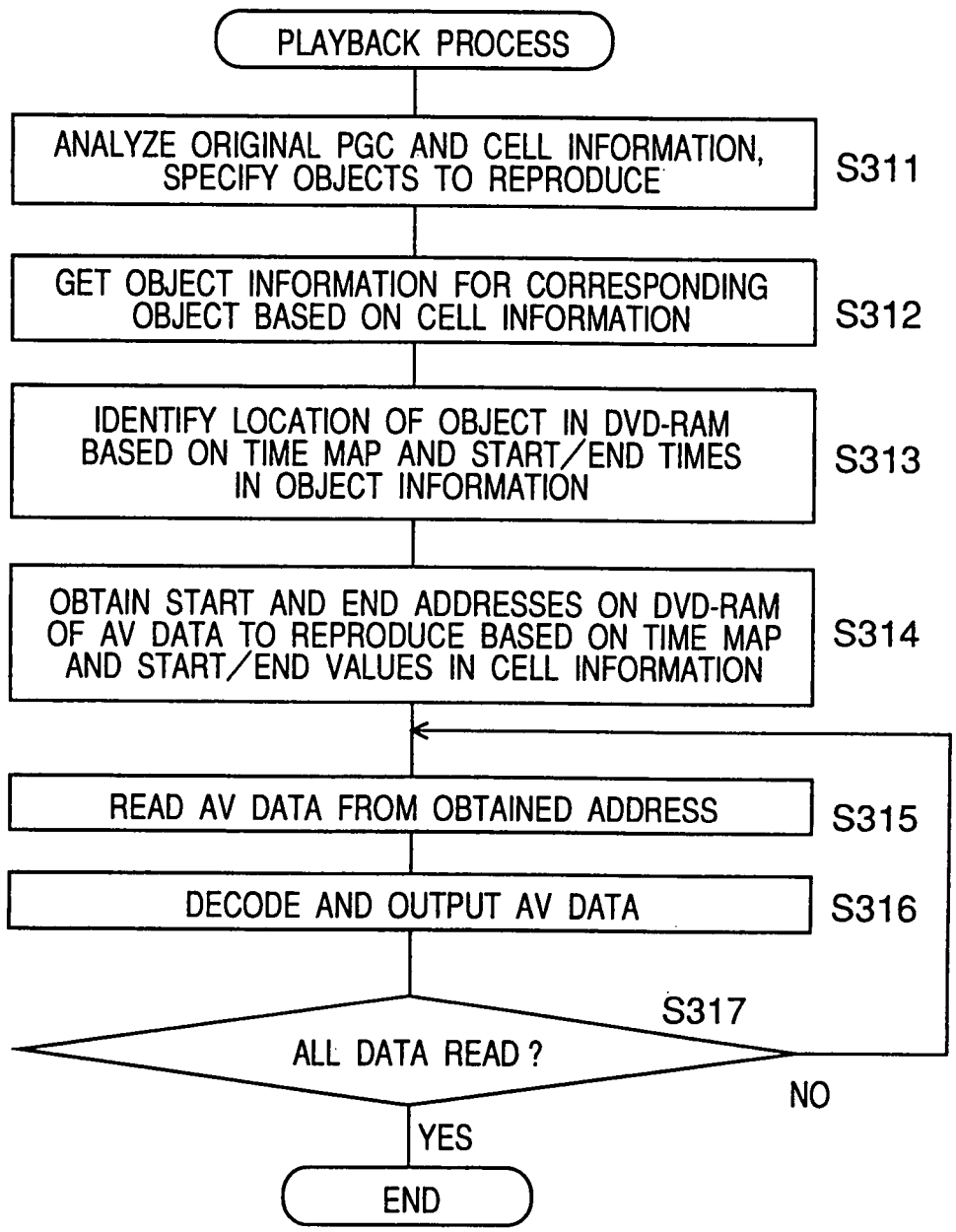
FIG. 31 is a flow chart of the recorder's playback operation.

Operation when the user request is to reproduce data recorded on a DVD-RAM disc according to the present invention is described next with reference to FIG. 31. FIG. 31 is a flow chart of the playback process of DVD recorder 1900 shown in FIG. 18. Reproducing an original PGC comprising one digital broadcast object (D_VOB) and one cell information entry is described below. Note that DVD player 1700 described above (FIG. 17) can also perform the playback operation described below.

User interface 1901 first receives an original PGC play request from the user and passes the request to system controller 1902. System controller 1902 interprets the user request to detect an original PGC play request, and applies process requests to the appropriate modules. System controller 1902 interprets original PGC information 50 and cell information 60 (FIG. 7) to identify the object to be reproduced (step S311). That is, system controller 1902 analyzes the Type field in the cell information of the PGC information. If the Type field is set to D_VOB, system controller 1902 knows that the AV stream to play is an AV stream recorded as a MPEG transport stream.

Next, system controller 1902 finds the digital broadcast object information (D_VOBI) corresponding to the ID read from the cell information in table (D_AVFIT) (step S312). System controller 1902 then identifies the location of the object in the DVD-RAM disc based on the digital broadcast object starting time information (D_VOB_V_S_PTM), end time information (D_VOB_V_E_PTM), and time map (step S313). When the object location is identified, system controller 1902 determines the start and end addresses of the AV data to reproduce from the DVD-RAM disc based on the time map and start and end time values from the cell information (step S314).

Once the access address is known system controller 1902 sends a read request and the read address of DVD-RAM disc 100 to drive 1911. Drive 1911 then reads the AV data from the address specified by system controller 1902 and stores it to track buffer 1910 (step S315). System controller 1902 also tells decoder 1908 to decode the data. Decoder 1908 thus reads and decodes the AV data from track buffer 1910. The decoded AV data is then output through display unit 1907 (step S316).

Drive 1911 then determines if all data specified by system controller 1902 has been read (step S317). If reading is not completed the process returns to step S315 and reading the AV data continues. When all data has been read, drive 1911 notifies system controller 1902 and system controller 1902 thus sends a playback termination request to decoder 1908. Decoder 1908 continues reproducing data until track buffer 1910 is empty. When track buffer 1910 becomes empty and all data has been decoded and presented, decoder 1908 notifies system controller 1902 that playback is completed and the playback process ends.

The playback process is described above using by way of example an original PGC containing only one digital broadcast object (D_VOB) and one cell information entry. It will be noted, however, that an AV stream can be reproduced using this same process whether the original PGC contains only one or plural movie video objects (M_VOB), multiple digital broadcast objects, or a mixture of movie objects and digital broadcast objects. This also applies to an original PGC containing plural cells and to a user-defined PGC.

How a stream object (SOB) is reproduced when decoder 1908 does not have a playback function compatible with all AV streams is described next. Referring again to FIG. 18, an MPEG transport stream cannot be reproduced through decoder 1908 as described above if decoder 1908 does not have a playback function compatible with the MPEG transport stream. In this case the data is passed through the digital interface 1909 to an external device, which reproduces the data.

The system controller 1902 sends an external data output request to digital interface 1909 instead of sending a playback request to decoder 1908 when it detects that the cell information of PGC information requested for playback by the user is a stream object (SOB) not supported by the system. Digital interface 1909 then transfers the AV data stored in track buffer 1910 according to the communication protocol of the connected digital interface. Note that except for this process operation is the same as when reproducing a digital broadcast object (D_VOB). System controller 1902 can determine whether decoder 1908 is compatible with the AV stream to be reproduced, or system controller 1902 can poll decoder 1908. Decoder 1908 references the PSI/SI information of the MPEG transport stream to determine compatibility with the particular stream.

It is important to note that some stream object (SOB) playback capabilities may be limited because the player cannot analyze stream content. It may be difficult to achieve certain so-called trick play modes such as slow play in a stream object (SOB) for which stream data content cannot be analyzed because such modes require repeatedly outputting stream data that can be played alone.

Therefore, when a DVD recorder 1900 according to this embodiment of the invention receives a trick playback mode instruction from the user it reads the cell Type field and reports to user interface 1901 that the selected trick playback mode is not possible if it detects a stream object (SOB).

Because of the above-described restrictions on stream object (SOB) playback, it is also possible to prohibit mixing a stream object (SOB) with other object types, such as digital broadcast object (D_VOB) or movie video object (M_VOB), in the same PGC when generating the PGC information determining the playback sequence of a continuous AV stream.

A process for handling user requests to set an entry point to an optical disc recording AV data is described next with reference to FIG. 32, a flow chart of the user entry point setting process.

When a request to set an entry point is received from the user through user interface 1901 (FIG. 18) (step S321), system controller 1902 (FIG. 18) reads the entry point table from the disc and presents all entry points and the defined attributes in the entry point table for the cell to user interface 1901 (step S322). The entry point table referred to here means the table of automatically set entry points and the user-defined entry point table shown in FIG. 15, that is, entry point table 72 of cell information 71 in user-defined PGC information 70 (FIG.

7) and entry point table 80*d* in object information (ObjectI) 80 (FIG. 7). It is also possible, however, to present only the user-defined entry point table. The attribute data can also not be displayed if it is not particularly needed.

The attribute information includes the following flags and fields, for example: PG_Change indicating a program change; PSI_SI indicating a change in the PSI/SI information of the transport stream; SQH_Change indicating a change in an attribute of the MPEG stream in the transport stream; Data_Top indicating the starting point of the data carousel; Data_Change indicating the location of a change in data carousel content; PMT_Change indicating the location of a change in PMT content; DE_Change indicating the location of a data event update; Module_Change indicating the location of a module update; Aud_Change indicating an audio attribute change; Multi_View indicating the number of views in a program for multi-view compatibility; and a parental control field.

Based on the displayed entry points and attribute data, the user can reproduce content from any point needed, and can easily find a desired scene in a particular program and a desired entry point to a desired data broadcast or multi-view program.

The user then instructs DVD recorder 1900 to mark the selected entry point (step S323). When an entry point marking command is received from the user, system controller 1902 of DVD recorder 1900 adds an entry to the user-defined entry point table (step S324). If the user wants to set an entry point to a location other than the original entry points, the starting and end points of the stream interval to be marked by an entry point must be specified. Based on the indicated starting point, system controller 1902 of DVD recorder 1900 then retrieves the presentation time stamp (PTS) corresponding to the specified starting point. System controller 1902 then adds an entry to the user-defined entry point table and records the detected presentation time stamp (PTS) to the end time field EP_PTM. Note that the USER_EP flag of the entry point table is set if two different entry point tables such as shown in FIG. 15 are not used and automatically set entry points and user-defined entry points are managed in a single table such as shown in FIG. 14.

The process ends when setting the entry points is completed (step S324). If setting the entry points is not completed, the process returns to step S322 and all previously set entry points and corresponding attributes are displayed.

A user-defined entry point playback process is described next with reference to FIG. 33. FIG. 33 is a flow chart of the user-defined entry point playback process.

When system controller 1902 receives an entry point playback request from a user (step S331), it detects whether a user-defined entry point table (that is, entry point table 72 or the bottom table in FIG. 15) is located on the optical disc (step S332). If a user-defined entry point table is already present, the table is read and stored to memory for displaying, and the entry points are displayed (step S334). This enables the user to select a desired playback start position from among only the necessary entry points without being confused by the simultaneous display of numerous entry points the user is not conscious of. If there is no user-defined entry point table on the disc, the automatically set entry point table is read, stored to memory and the entry points are displayed (step S334). Note that if an entry point table as shown in FIG. 14 is used the USER_EP flag can be referenced for each entry point to display only the entry points for which the USER_EP flag is set.

If the user selects an entry point, system controller 1902 receives information identifying the selected entry point from user interface 1901 (step S335). System controller 1902 then detects the time value EP_PTM for the selected entry point from the entry point table (step S336). The precision of entry point time values in the entry point table is normally 27 MHz as used in MPEG. Note that the video frame number or a value minus the lowest bits of a video manager general information (VMGI) 90 KHz or 27 MHz clock could be used.

The system controller 1902 then converts this time information to a disc sector location value using the time map in the object information of the corresponding digital broadcast object (D_VOB) (step S337). System controller 1902 then reads the MPEG transport stream from the optical disc starting from this sector location (step S338).

Images or sound can thus be reproduced from an entry point (scene) selected by the user. System controller 1902 also detects the ViewType field in the cell information. If the ViewType is set to any value other than zero, that is, if the object is a multi-view object, system controller 1902 reports the ViewType value from the cell information to user interface 1901. Based on the reported view type, DVD recorder 1900 presents the number of multiple views on the screen of user interface 1901 as on-screen display (OSD) information, for example.

Figure 32:
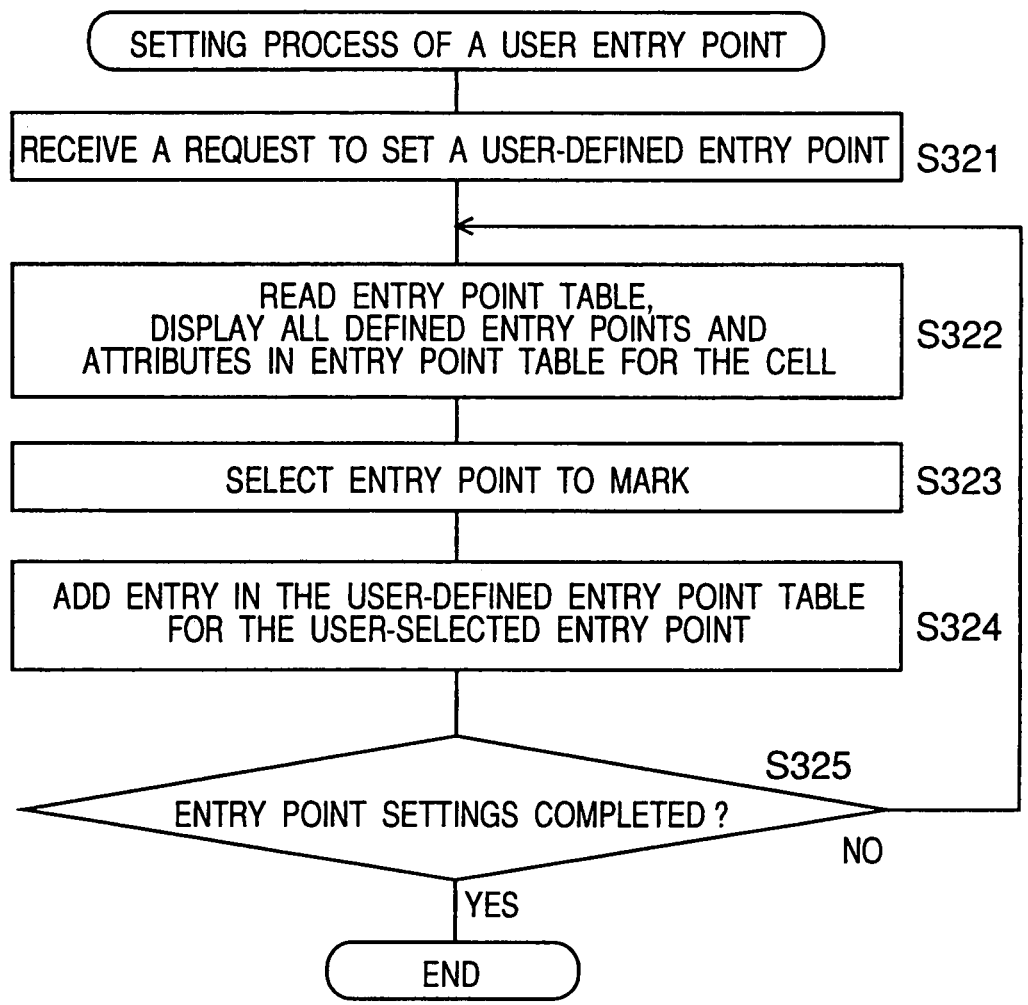
FIG. 32 is a flow chart showing an entry point setting process.

It will be noted that FIG. 32, FIG. 33, and the related description of the invention assume that all entry points are displayed. It will be obvious, however, that it is not necessary to present all entry points. For example, only entry points having a change in a particular attribute could be selectively displayed, or only entry points in a particular time band could be selectively displayed. This selection is possible based on the attributes defined in the entry point tables or the time value (EP_PTM).

The DVD recorder is described reproducing AV streams not supported by the decoder by passing the stream through the digital interface to an external device. It is also possible, however, to pass AV streams supported by the decoder through the digital interface to a set-top box or other external device in response to a user request.

Furthermore, the present invention is described herein using an optical disc, an optical disc recorder, and an optical disc player by way of example, but the same benefits can also be achieved using like components and processes when the MPEG transport stream is recorded on a hard disk or other data storage medium. The present invention shall not, therefore, be limited to physical media. The "like components" can also be achieved using the central processing unit (CPU) of a personal computer or image processing chips.

The CPU and other components in this case operate according to a computer-executable recording program implementing the steps of the processes shown in the accompanying flow charts (FIG. 19 and FIGS. 31 to 33). The program itself can be recorded on a flexible disk, optical disc, semiconductor memory, or other memory or storage medium, and can be transmitted over the Internet or other communication line for installation to a personal computer.

This embodiment of the invention has also been described using the MPEG transport stream as a self-encoded stream, but the MPEG program stream or other stream formats can be alternatively used.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A recording apparatus comprising:
a receiver device operable to receive a digital stream, which is a multiplex of a video stream and an audio stream;
an input device operable to receive a first entry point representing a starting point of a playback of the digital stream, the first entry point being defined by a user;
an analyzer operable to automatically produce, during a monitoring of the digital stream, a second entry point representing a change point at which an attribute of the digital stream changes;
a control device operable to generate management information; and
a drive device operable to record the generated management information and the digital stream onto a recording medium,
wherein the management information includes:
playback path information representing a playback path of the digital stream; and
stream management information for managing the digital stream, the stream management information being different from the playback path information,
wherein the playback path information contains the first entry point,
wherein the stream management information contains the second entry point,
wherein the first entry point is defined by a first type information table storing first type information,
wherein the second entry point is defined by a second type information table storing the first type information, and
wherein one of the first and second type information tables further stores second type information.

2. A recording method comprising:
receiving, via a receiver unit of a recording apparatus, a digital stream, which is a multiplex of a video stream and an audio stream;
receiving a first entry point representing a starting point of a playback of the digital stream, the first entry point being defined by a user;
automatically producing, during a monitoring of the digital stream, a second entry point representing a change point at which an attribute of the digital stream changes;
generating management information; and
recording the generated management information and the digital stream onto a recording medium,
wherein the management information includes:
playback path information representing a playback path of the digital stream; and
stream management information for managing the digital stream, the stream management information being different from the playback path information,
wherein the playback path information contains the first entry point,
wherein the stream management information contains the second entry point,
wherein the first entry point is defined by a first type information table storing first type information,
wherein the second entry point is defined by a second type information table storing the first type information, and
wherein one of the first and second type information tables further stores second type information.

3. A non-transitory computer-readable recording medium having data recorded thereon by a recording apparatus, wherein the data comprises:
a digital stream, which is a multiplex of a video stream and an audio stream; and
management information,
wherein the management information includes:
playback path information representing a playback path of the digital stream; and
stream management information for managing the digital stream, the stream management information being different from the playback path information,
wherein the playback path information contains first type information representing a starting point of a playback of the digital stream, the first entry point being defined by the user,
wherein the stream management information contains second type information representing a change point at which an attribute of the digital stream changes, the second entry point being automatically produced during a monitoring of the digital stream,
wherein the first entry point is defined by a first type information table storing first type information,
wherein the second entry point is defined by a second type information table storing the first type information, and
wherein one of the first and second type information tables further stores second type information.

4. A reproducing apparatus comprising:
a reading device operable to read a digital stream and management information from a recording medium, the digital stream being a multiplex of a video stream and an audio stream; and
a playback device operable to playback the digital stream in accordance with the management information,
wherein the management information includes:
playback path information representing a playback path of the digital stream; and
stream management information for managing the digital stream, the stream management information being different from the playback path information,
wherein the playback path information contains first type information representing a starting point of a playback of the digital stream, the first entry point being defined by the user,
wherein the stream management information contains second type information representing a change point at which an attribute of the digital stream changes, the second entry point being automatically produced by a recording apparatus during a monitoring of the digital stream by the recording apparatus,
wherein the first entry point is defined by a first type information table storing first type information,
wherein the second entry point is defined by a second type information table storing the first type information, and
wherein one of the first and second type information tables further stores second type information.

5. A reproducing method comprising:
reading, via a reading unit of a reproducing apparatus, a digital stream and management information from a recording medium, the digital stream being a multiplex of a video stream and an audio stream; and
playing back the digital stream in accordance with the management information,
wherein the management information includes:
playback path information representing a playback path of the digital stream; and
stream management information for managing the digital stream, the stream management information being different from the playback path information,
wherein the playback path information contains first type information representing a starting point of a playback of the digital stream, the first entry point being defined by the user, wherein the stream management information contains second type information representing a change point at which an attribute of the digital stream changes, the second entry point being automatically produced by a recording apparatus during a monitoring of the digital stream by the recording apparatus, wherein the first entry point is defined by a first type information table storing first type information, wherein the second entry point is defined by a second type information table storing the first type information, and wherein one of the first and second type information tables further stores second type information.

* * * * *